(12) United States Patent
Cruz

(10) Patent No.: US 9,057,322 B2
(45) Date of Patent: *Jun. 16, 2015

(54) ROTARY INTERNAL COMBUSTION ENGINE

(71) Applicant: Jose Lopez Cruz, Poway, CA (US)

(72) Inventor: Jose Lopez Cruz, Poway, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,101

(22) Filed: Jul. 14, 2014

(65) Prior Publication Data
US 2014/0318123 A1 Oct. 30, 2014

Related U.S. Application Data

(63) Continuation of application No. 13/252,199, filed on Oct. 4, 2011, now Pat. No. 8,776,759.

(51) Int. Cl.
F02B 53/00 (2006.01)
F02B 55/14 (2006.01)
F02B 53/10 (2006.01)

(52) U.S. Cl.
CPC .................. F02B 55/14 (2013.01); F02B 53/00 (2013.01); Y02T 10/17 (2013.01); F02B 53/10 (2013.01)

(58) Field of Classification Search
CPC .................................. F02B 53/00; Y02T 10/17
USPC ..................... 123/200, 237, 248, 243
See application file for complete search history.

(56) References Cited

U.S. PATENT DOCUMENTS

| 1,402,057 | A | 1/1922 | Davis | |
|---|---|---|---|---|
| 2,409,141 | A | 10/1946 | Margolis | |
| 2,583,633 | A | 1/1952 | Cronin | |
| 2,674,234 | A * | 4/1954 | Riggle | 123/235 |
| 2,988,065 | A | 6/1961 | Wankel et al. | |
| 3,228,183 | A | 1/1966 | Feller | |
| 3,259,115 | A | 7/1966 | Bensinger et al. | |
| 3,694,113 | A | 9/1972 | Jones et al. | |
| 3,716,989 | A * | 2/1973 | Moreira | 123/229 |
| 3,797,464 | A | 3/1974 | Abbey | |
| 3,918,413 | A | 11/1975 | Eiermann et al. | |
| 3,921,595 | A | 11/1975 | Saunders | |
| 3,987,758 | A | 10/1976 | Wankel | |
| 3,996,898 | A | 12/1976 | Hart et al. | |
| 4,075,981 | A | 2/1978 | Durst | |
| 5,305,721 | A | 4/1994 | Burtis | |
| 2007/0251472 | A1 * | 11/2007 | Fiveland | 123/64 |

* cited by examiner

Primary Examiner — Mary A Davis
(74) Attorney, Agent, or Firm — Vista IP Law Group LLP

(57) ABSTRACT

A rotary engine rotary engine according to the present invention comprises a main housing assembly and a rotor assembly rotatably supported within the housing. The rotor assembly has two rotors, an intake/compression rotor rotatably disposed within the intake/compression housing, and a power/exhaust rotor rotatably disposed within the power/exhaust housing. The rotors have N number of apexes and sides, wherein N is an integer greater than 2. A rotating chamber is formed between each side of the each rotor and the inner wall of the respective housing. The stages of the thermodynamic cycle of the engine occur within these chambers. For example, if the rotors have three sides, the rotors will have a triangular-like shape with three apexes. The apexes form the outermost radial part of the rotors which engage the inner wall of the respective housing bore. Each of these chambers is split into two divided chambers by a reciprocating vane, thereby forming 2 times N divided chambers in each of the respective housing bores.

18 Claims, 22 Drawing Sheets

ROTARY INTERNAL COMBUSTION ENGINE

RELATED APPLICATION DATA

This application is a continuation of U.S. patent application Ser. No. 13/252,199, filed Oct. 4, 2011, now issued as U.S. Pat. No. 8,776,759, which application is incorporated herein by reference.

FIELD OF THE INVENTION

The present invention relates generally to internal combustion engines, and more particularly to a rotary-type internal combustion engine.

BACKGROUND OF THE INVENTION

Most internal combustion engines convert the chemical energy of a fuel source, such as gasoline, to thermal energy, and in turn, convert the thermal energy to mechanical energy, utilizing a thermodynamic cycle, such as a form of an Otto cycle. While the Otto cycle is theoretically an idealized cycle, actual engines operate using the same four basic stages, namely, (1) intake of fuel and air, (2) compression of the fuel-air mixture, (3) combustion of the fuel and air causing expansion, (4) and exhaust of the products of combustion. In a reciprocating piston-type engine, these four stages are often equated with the four strokes of each piston to complete a full cycle, and are called (1) the intake stroke, (2) the compression stroke, (3) the power stroke (expansion following combustion), and (4) the exhaust stroke. Thus, the name "four-stroke" engine for the most commonly used internal combustion engine. Such engines are used in many automobiles and other vehicles, such as aircraft and marine craft, as well as industrial engines, stationary power plants, and small engine applications such as lawn mowers.

In many applications of piston-type, four-stroke engines, the reciprocating linear motion of the pistons is translated to rotational motion using piston rods and linkages to a crankshaft. In an automobile, for example, the crankshaft is then coupled to a flywheel, and the other end of the flywheel shaft is coupled to the transmission.

Rotary-type engines have also been developed which operate using the Otto cycle and its four stages. For instance, the Wankel rotary engine is probably the best known and most commonly used rotary internal combustion engine. Various Wankel rotary engine designs are described in U.S. Pat. Nos. 2,988,065; 3,918,413; 3,987,758, as examples. The contents of each of these patents is expressly incorporated by reference herein in their entireties. Generally, the Wankel rotary engine utilizes a housing having an epitrochoid interior wall (oval-like) and a rotor within the housing. The rotor has a triangular shape with convex curved sides. The space between the three sides of the rotor and the inside surface of the housing creates three separate cavities. The rotor is supported by an eccentric shaft which passes through the interior of the rotor at a location displaced from the geometric center of a cross-section of the rotor. The rotor both rotates and orbitally revolves around the eccentric shaft. The motion (rotation and orbital revolution) of the rotor is controlled by a pair of synchronizing gears. An internal ring gear attached to the rotor engages a fixed spur gear mounted to the housing. The gears cause the rotor to revolve ⅓ of a rotation around the housing for each turn of the eccentric shaft.

As the rotor rotates and orbitally revolves, the three sides of the rotor move closer to and then away from the interior wall of the housing thereby compressing and expanding the three cavities, similar to the strokes of a piston in a reciprocating engine. Each cavity of the Wankel rotary engine experiences one combustion stroke for each driveshaft rotation. In other words, one cavity completes the four strokes of the Otto cycle for each orbital revolution of the rotor, and each of the three cavities completes an Otto cycle for each full rotation of the rotor.

There are a number of other types of internal combustion engines that have been developed. For example, internal combustion engines have been developed based on a two-stroke cycle or a six-stroke cycle. Some internal combustion engines operate on the Brayton cycle as opposed to the Otto cycle, such as gas turbines, jet engines, turboprops and the like. There are also compression ignition engines, also known as diesel engines.

Internal combustion engines are commonly used for mobile propulsion in vehicles and portable machinery because of their ability to attain high power-to-weight ratios in addition to excellent fuel energy density. Generally using fossil fuel (mainly petroleum), these engines have appeared in transport in almost all types of vehicles, including automobiles, trucks, motorcycles, boats, and in a wide variety of aircraft and locomotives.

While a variety of engines have been previously developed, the prior art does not disclose or suggest an engine according to the present invention.

SUMMARY OF THE INVENTION

The present invention is directed to an engine for converting stored energy to mechanical energy. For instance, the engine is a pistonless, rotary engine, as opposed to the piston-type, reciprocating engines having rotating cylinder blocks. The rotary engine is typically an internal combustion engine operating on a four-stage Otto cycle. The fuel may be any available fuel such as gasoline, biofuels, hydrogen, or other suitable fuel.

Generally, the rotary engine according to the present invention comprises a main housing assembly and a rotor assembly rotatably supported within the housing. The main housing assembly has two housings, an intake/compression housing and a power/exhaust housing. The two housings can be integrally formed or separate. Each housing has a bore having a cylindrical inner wall.

The rotor assembly has two rotors, an intake/compression rotor rotatably disposed within the intake/compression housing, and a power/exhaust rotor rotatably disposed within the power/exhaust housing. The rotors have N number of sides, wherein N is an integer greater than 2, and the two rotors also have the same number of sides. As discussed below, the present invention includes engine designs for different numbers of sides, N, for the rotors. A rotating chamber is formed between each side of the each rotor and the inner wall of the respective housing. The stages of the thermodynamic cycle of the engine occur within these chambers. For example, if the rotors have three sides, the rotors will have a triangular-like shape with three apexes. The apexes form the outermost radial part of the rotors which engage the inner wall of the respective housing bore. Thus, for three-sided rotors, three chambers are formed within each housing bore by each rotor, i.e. three chambers in the intake/compression bore and three chambers in the power/exhaust bore. Each of these chambers is split into two divided chambers by a reciprocating vane having a rounded end engaging the outer radial part of the rotors, thereby forming 6 divided chambers in each of the respective housing bores. Within the intake/compression bore, an intake stage occurs on one side of each of the vanes (the trailing side in the direction of rotation of the rotors), and a compression stage occurs on the other side of each of the vanes (the leading side in the direction of rotation of the rotors). Within the power/exhaust bore, a power stage occurs on one side of each of the vanes (the trailing side in the direction of rotation of the rotors), and an exhaust stage occurs on the other side of each of the vanes (the leading side in the direction of rotation of the rotors).

The present invention is not limited to an engine design that is configured for rotors having only one specific number of sides, but includes engines configured for rotors having any integer number of sides. As other examples, a design with N=4 will have four-sided (quadrilateral) rotors, a design with N=5 will have five-sided (pentagonal) rotors, a design with N=6 will have six-sided (hexagonal) rotors, and so on.

With these basic features in mind, in one embodiment, an engine according to the present invention comprises an intake/compression housing having an intake/compression bore which has a cylindrical inner wall. The cylindrical inner wall has an axis of the cylindrical wall, which will be referred to as the first axis for convenience. The intake/compression housing has N intake ports in fluid communication with the intake/compression bore, wherein N is an integer greater than 2. As will be seen by the description below, the number N will define the number of many of the components of the engine, as the number N determines the number of rotating chambers within the engine.

A power/exhaust housing having a power/exhaust bore is opposed to the intake/compression bore. The power/exhaust bore has a cylindrical inner wall having a second axis. In another aspect, the second axis is coaxial to the first axis, such that the power/exhaust bore and intake compression bore are coaxial, with their respective axes spaced apart along the same line. The power/exhaust housing has N exhaust ports in fluid communication with the power/exhaust bore.

An intake/compression rotor is disposed within the intake/compression bore. The intake/compression rotor is rotatable relative to the intake/compression bore about a third axis of rotation which is coaxial to the first axis. The intake/compression rotor has N sides and N apex portions which engage the inner wall of the intake/compression bore. As used herein, the term "engage" means that one component either contacts the other component or is in very close proximity to the other component such that a substantial seal is formed at the area of contact or close proximity. The intake/compression rotor also has N intake/compression crossover ports, which provide a fluid path toward the power/exhaust bore.

There are N reciprocating intake/compression vanes extending into the intake/compression bore through a slot in the inner wall of the intake/compression bore. The N intake/compression vanes are spaced circumferentially around the inner wall of the intake/compression bore. Each of the intake/compression vanes has a contact surface which contacts an outer surface of the intake/compression rotor. The intake/compression vanes are configured to reciprocate in and out of the intake/compression bore as the intake/compression rotor rotates about the second axis. The contact surface of each of the intake/compression vanes remains substantially in contact with the outer surface of the intake/compression rotor as such rotor rotates.

A power/exhaust rotor is disposed within the power/exhaust bore. The power exhaust rotor is rotatable relative to the power/exhaust bore about a fourth axis of rotation which is coaxial to the second axis. The power/exhaust rotor has N sides and N apex portions which engage the inner wall of the power/exhaust bore. The power/exhaust rotor also has N power/exhaust crossover ports which provide a fluid path toward the intake/compression bore.

There are N reciprocating power/exhaust vanes extending into the power/exhaust bore through a slot in the inner wall of the power/exhaust bore. The N power/exhaust vanes are spaced circumferentially around the inner wall of the power/exhaust bore. Each of the power/exhaust vanes has a contact surface which contacts an outer surface of the power/exhaust rotor. The power/exhaust vanes are configured to reciprocate in and out of the power/exhaust bore as the power/exhaust rotor rotates about the fourth axis. The contact surface of the power/exhaust vanes remains substantially in contact with the outer surface of the power/exhaust rotor as the rotor rotates.

In another aspect of the present invention, the apex portions of the rotors are substantially symmetrically spaced circumferentially about their respective axes, and the vanes are substantially symmetrically spaced circumferentially around the inner wall of their respective bores. For example, for an engine in which N=3, the apex portions of the rotors are spaced 120 degrees from each other, and the vanes are spaced 120 degrees from each other; and for an engine in which N=4, the apex portions of the rotors are spaced 90 degrees from each other, and the vanes are spaced 90 degrees from each other.

In still another aspect of the present invention, N is from 3 to 15, or from 3 to 8, or from 3 to 5. In another aspect of the present invention, the second axis is coaxial to the first axis.

In yet another aspect of the present invention, the engine utilizes a four stage thermodynamic cycle including an intake stage, a compression stage, a combustion-power stage and an exhaust stage. The intake stage occurs on a first side of each intake/compression vane (the leading side in the direction of rotation of the rotors) and the compression stage occurs on a second side of each intake/compression vane (the trailing side in the direction of rotation of the rotors). The combustion-power stage occurs on a first side of the power/exhaust vane (the leading side in the direction of rotation of the rotors) and the exhaust stage occurs on a second side of the power/exhaust vane (the trailing side in the direction of rotation of the rotors).

In another aspect of the present invention, the engine also comprises a divider wall between the intake/compression bore and the power/exhaust bore. The divider wall is preferably stationary and fixed to the main housing. The divider wall has a plurality of divider crossover holes which are configured to align with the intake/compression crossover ports and the power/exhaust crossover ports at a crossover rotational position of the intake/compression rotor and the power/exhaust rotor. The crossover rotational position occurs just after the compression stage, thereby allowing a transfer of fluid from the intake/compression bore, through the intake/compression crossover ports and the divider crossover ports into the power/exhaust crossover ports, and into the power/exhaust bore. At other stages of the engine cycle, when the intake/compression rotor and the power/exhaust rotor are not at the crossover rotational position, the divider wall substantially seals the intake/compression crossover ports and the power/exhaust crossover ports.

The operation of the above-described engine will now be described according to another aspect of the present invention. First, the four stages of the engine operation will be described for a single cycle. As will be explained below, the four stages are occurring simultaneously in the different divided chambers of the engine, and the four stages of a cycle complete upon the rotors rotating through 360/N degrees.

Thus, N cycles occur as the rotors rotate through 360/N degrees, and N times N total cycles occur for each full 360 degree rotation of the rotors.

First, as the intake/compression rotor rotates, intake fluid is drawn through an intake port into the divided chamber on the first side of the intake/compression vane. As an apex of the intake/compression rotor passes the vane, intake fluid begins to be drawn into the divided chamber. As the intake/compression rotor continues to rotate, this divided chamber increases in volume, until the following apex passes the intake/compression vane. At this point, the following apex and side of the intake/compression rotor begins to compress the intake fluid in the divided chamber against the second side of the preceding vane. The volume of this divided chamber then decreases as the intake/compression rotor continues to rotate, until the following apex gets near the preceding vane. At this point, the crossover ports all line up and the compressed intake fluid flows through the intake/compression crossover port, the divider wall crossover port and the power/exhaust bore crossover port and into a divided chamber of the power/exhaust bore on the first side of a power/exhaust vane.

Shortly thereafter, as the power/exhaust rotor rotates such that the crossover ports are sealed, and an apex of the power/exhaust rotor passes the power/exhaust vane, combustion occurs in this divided chamber of the power/exhaust bore. Combustion causes the intake fluid to heat and expand, thereby exerting a pressure on the power/exhaust rotor, creating a torque on the power/exhaust rotor in the direction of rotation of the power/exhaust rotor. The volume of this divided chamber expands until the following apex of the power/exhaust rotor passes the power/exhaust vane. At this point, the volume of the divided chamber has started to decrease and continue decreasing as the power/exhaust rotor continues to rotate, and the combusted fluid is compressed against a first side of the preceding power/exhaust vane, thereby forcing the combusted fluid out of an exhaust port. The exhaust stage continues until the following apex approaches the preceding power/exhaust vane.

As mentioned above, the four stages of a thermodynamic cycle are occurring at the same time as the intake/compression rotor and power/exhaust rotor rotate. More specifically, as the intake stage is occurring on the first side of each intake/compression vane, the compression stage is occurring on the second side of each intake/compression vane. Simultaneously to the intake stage and compression stage occurring within the divided chambers of the intake/compression bore, the combustion-power stage is occurring on the first side of each power/exhaust vane at the same time the exhaust stage is occurring on the second side of each power/exhaust vane. The intake/compression rotor and power/exhaust rotor rotate 1/N rotation (360/N degrees) to complete each stage. Because the stages are occurring simultaneously in the N divided chambers for each stage, N cycles occur each 1/N rotation of the rotors. Therefore, upon a full rotation (revolution) of the rotors, N cycles occur in N pairs of divided chambers, such that N times N total cycles occur for each full rotation of the rotor. For example, for an engine in which N=3, three cycles occur each ⅓ rotation (120 degrees), and 9 cycles occur per revolution of the rotors; for an engine in which N=4, four cycles occur each ¼ rotation (90 degrees), and 16 cycles occur per revolution of the rotors; and so on for various N values.

BRIEF DESCRIPTION OF THE DRAWINGS

The invention is illustrated by way of example, and not limitation, in the figures of the accompanying drawings, in which like reference numbers refer to similar elements, and the description for like elements shall be applicable for all described embodiments wherever relevant.

DETAILED DESCRIPTION OF THE INVENTION

Figure 1:
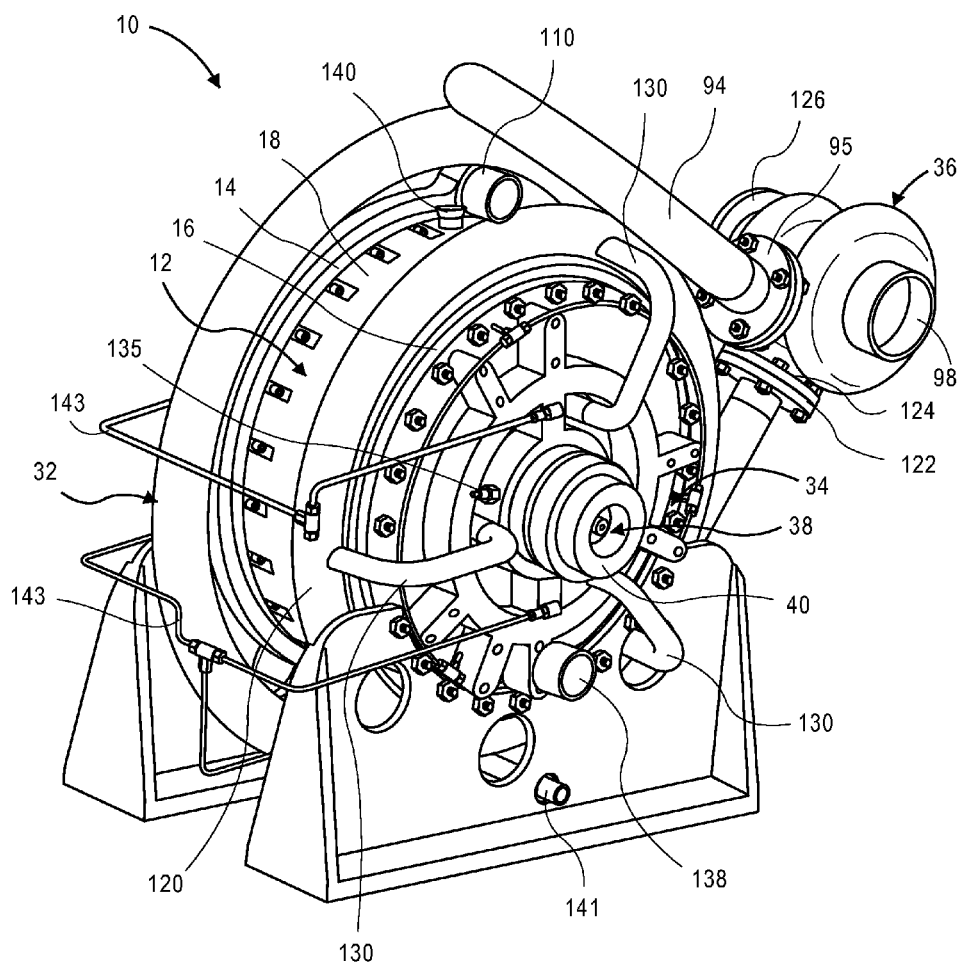
FIG. 1 is a front, perspective view of an engine according to one embodiment of the present invention.

Referring to FIG. 1, an engine 10 according to one embodiment of the present invention is shown. The engine 10 comprises a main housing assembly 12 which is stationary relative to the moving engine components. The main housing assembly 12 provides a support structure and an enclosure for the engine 10. The main housing assembly 12 may be made of aluminium or aluminium based alloy, steel, metal alloy, composite material, nano materials, or other suitable material having sufficient strength and heat tolerance (strength at internal combustion engine operating temperatures).

Figure 5:
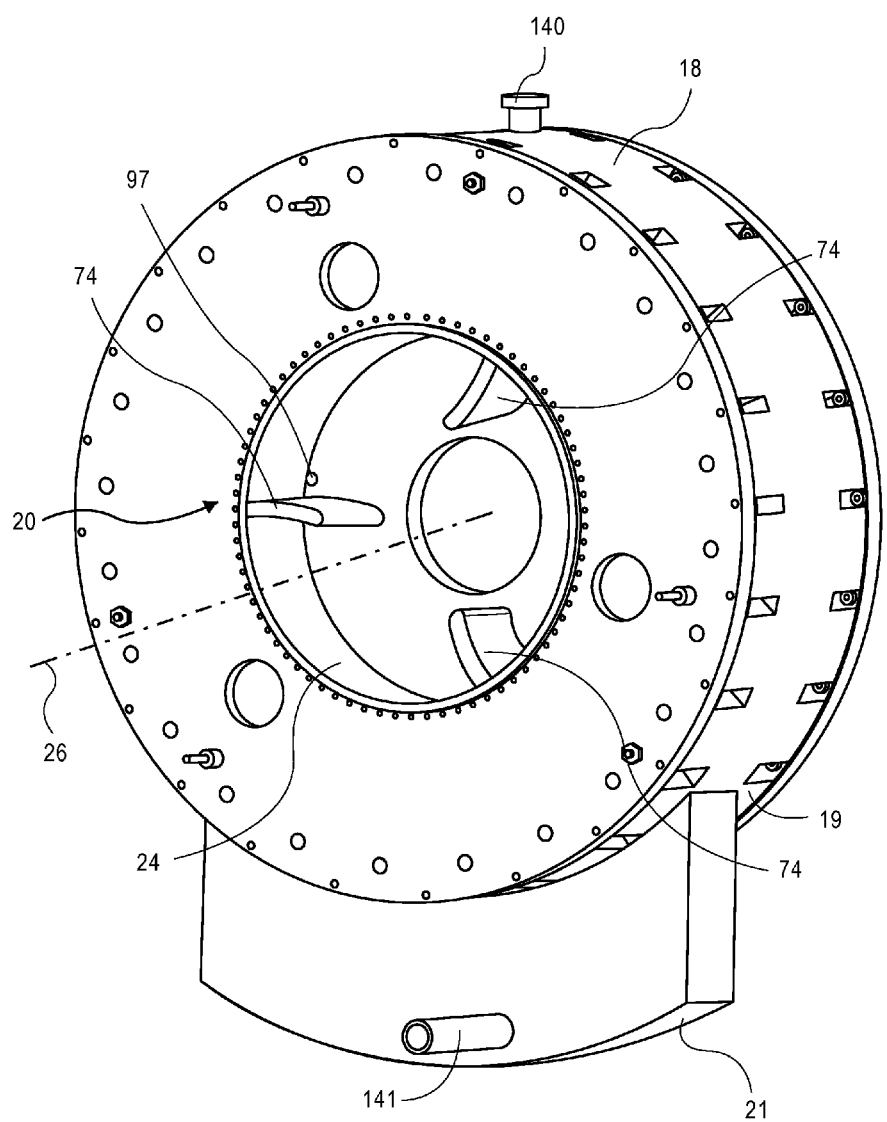
FIG. 5 is a side, perspective view of the main housing assembly of the engine of FIG. 1.
Figure 7:
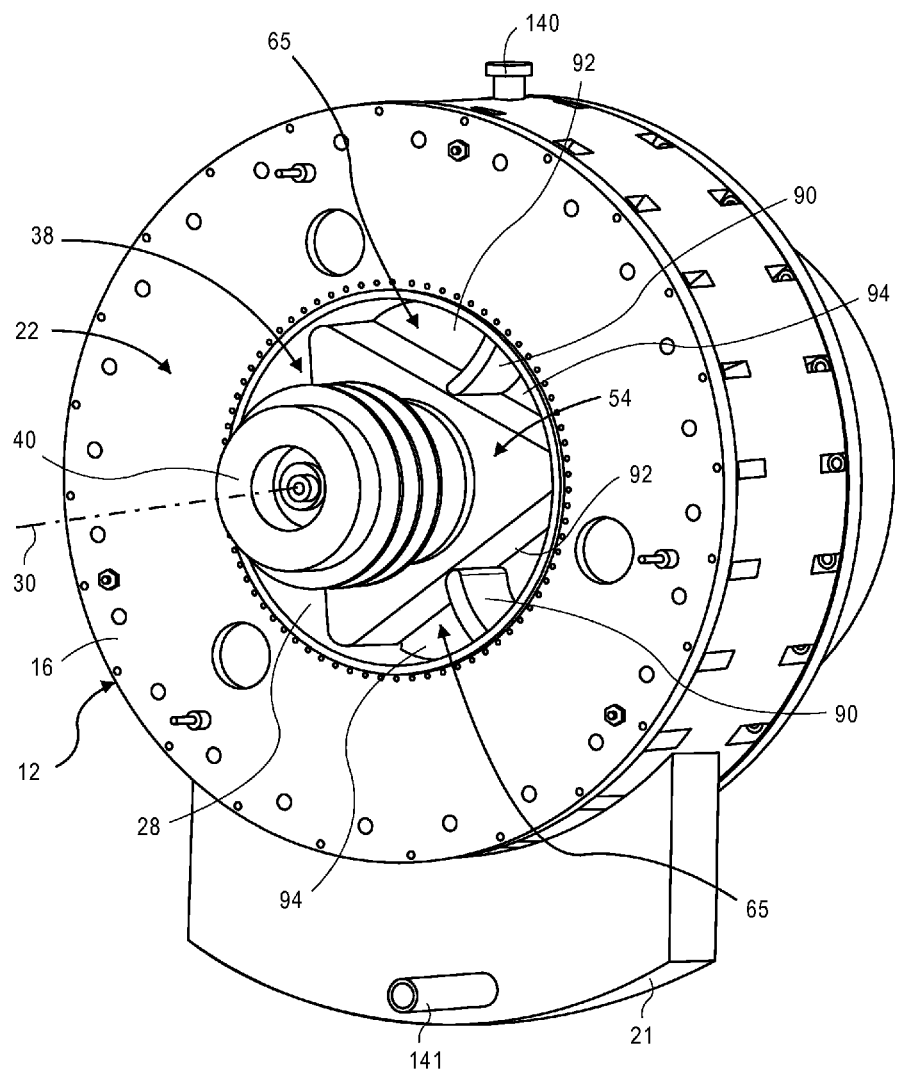
FIG. 7 is a side, perspective view of the main housing assembly and main rotor assembly of the engine of FIG. 1.
Figure 8:
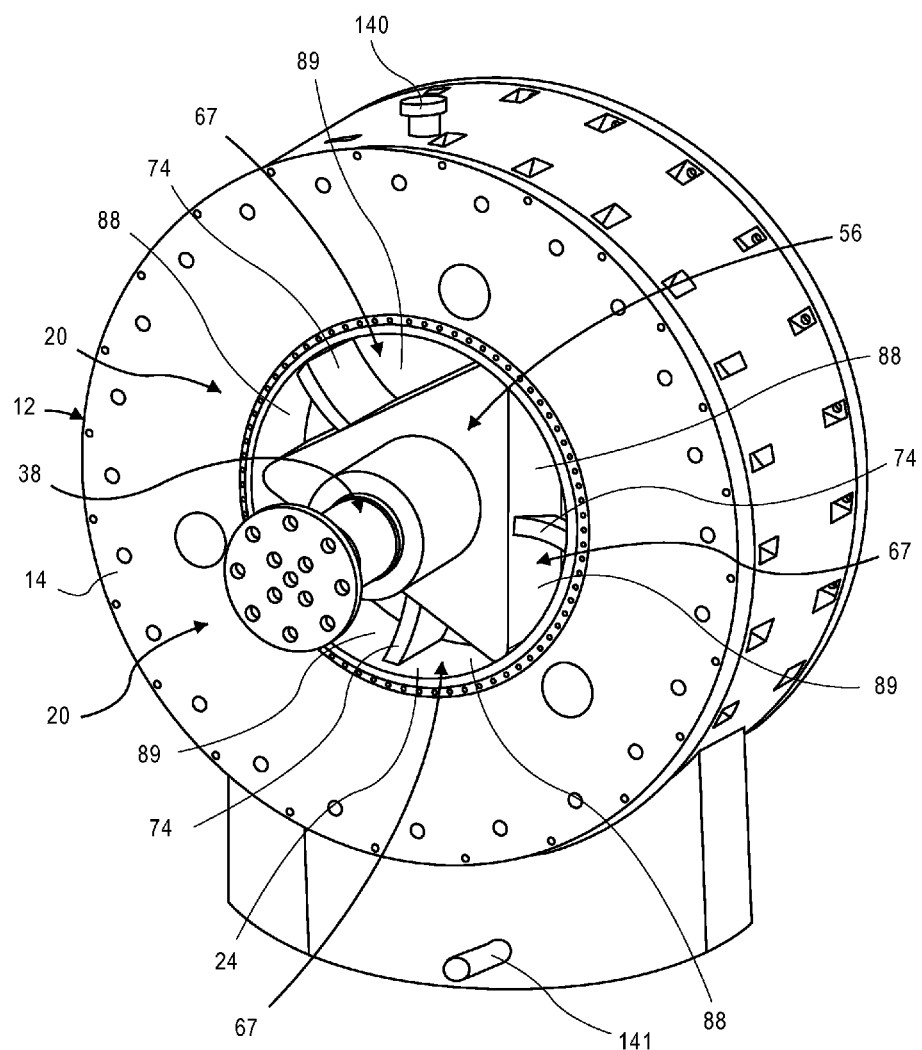
FIG. 8 is a side, perspective view of the main housing assembly and main rotor assembly of the engine of FIG. 1.
Figure 9:
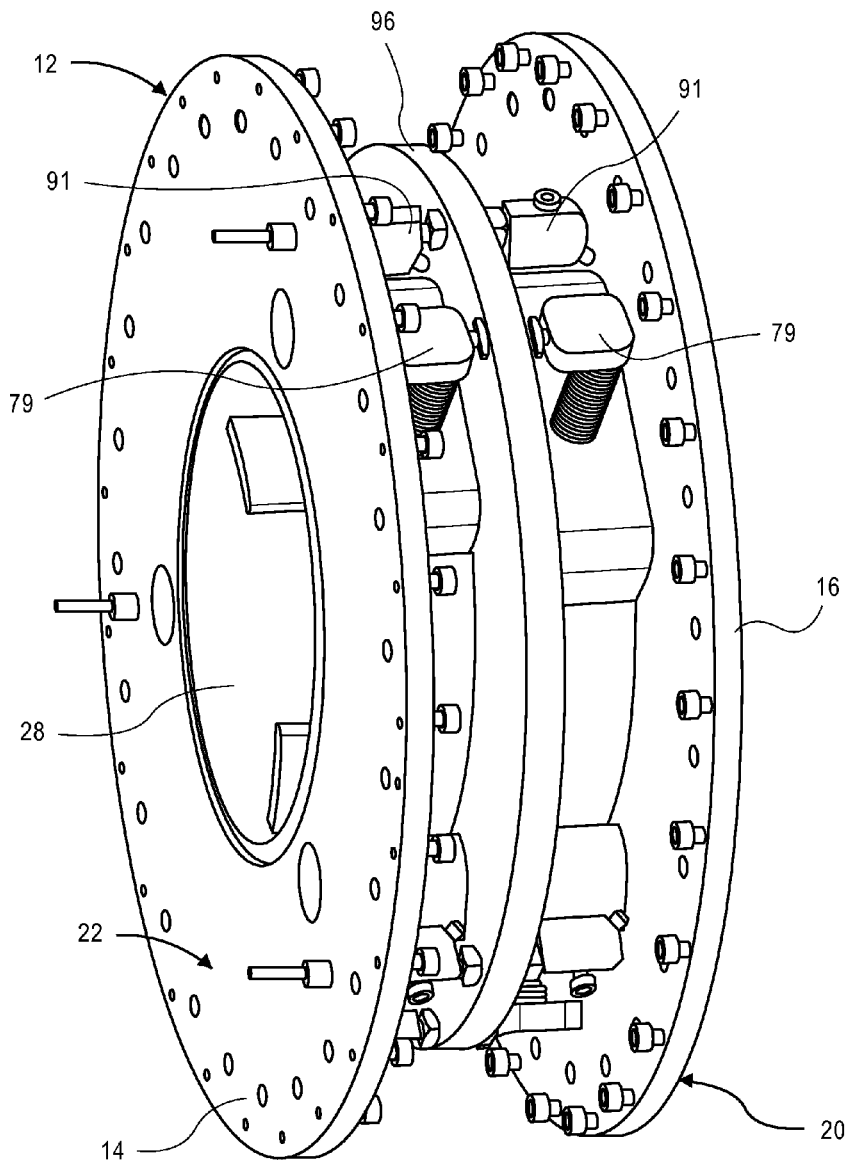
FIG. 9 is a side, perspective view of the main housing assembly of the engine of FIG. 1, with the housing assembly cover removed.

The main housing assembly 12 comprises a pair of opposing discs 14, 16, a partial cylinder top cover 18 and a partial cylinder bottom cover 19 having a lube oil sump 21 (see FIGS. 5 and 7). Turning to FIG. 9, the main housing assembly 12 is shown with the top and bottom covers 18, 19 removed. As better shown in FIG. 8, the main housing assembly 12 comprises an intake/compression housing 20, and a power/exhaust housing 22 (see FIG. 7). The intake/compression housing 20 comprises an intake/compression bore formed by a cylindrical inner wall 24 (see FIG. 5). The cylindrical inner wall 24 has a first axis 26. The power/exhaust housing 22 has a power/exhaust bore formed by a cylindrical inner wall 28 having a second axis 30 (see FIG. 7). The cylindrical inner wall 24 is coaxial to the cylindrical inner wall 28 (i.e. the first axis and second axis are on the same line).

Returning to FIG. 1, the main housing assembly 12 also comprises an intake manifold assembly 32 (which may be part of the intake/compression housing 20) mounted to the disc 14, and an exhaust manifold assembly 34 (which may be part of the power/exhaust housing 22) mounted to disc 16. The engine 10 may also be turbocharged utilizing a turbocharger 36 operably coupled to the intake manifold assembly 32 and the exhaust manifold assembly 34. Each of these components will be described in greater detail below.

Figure 3:
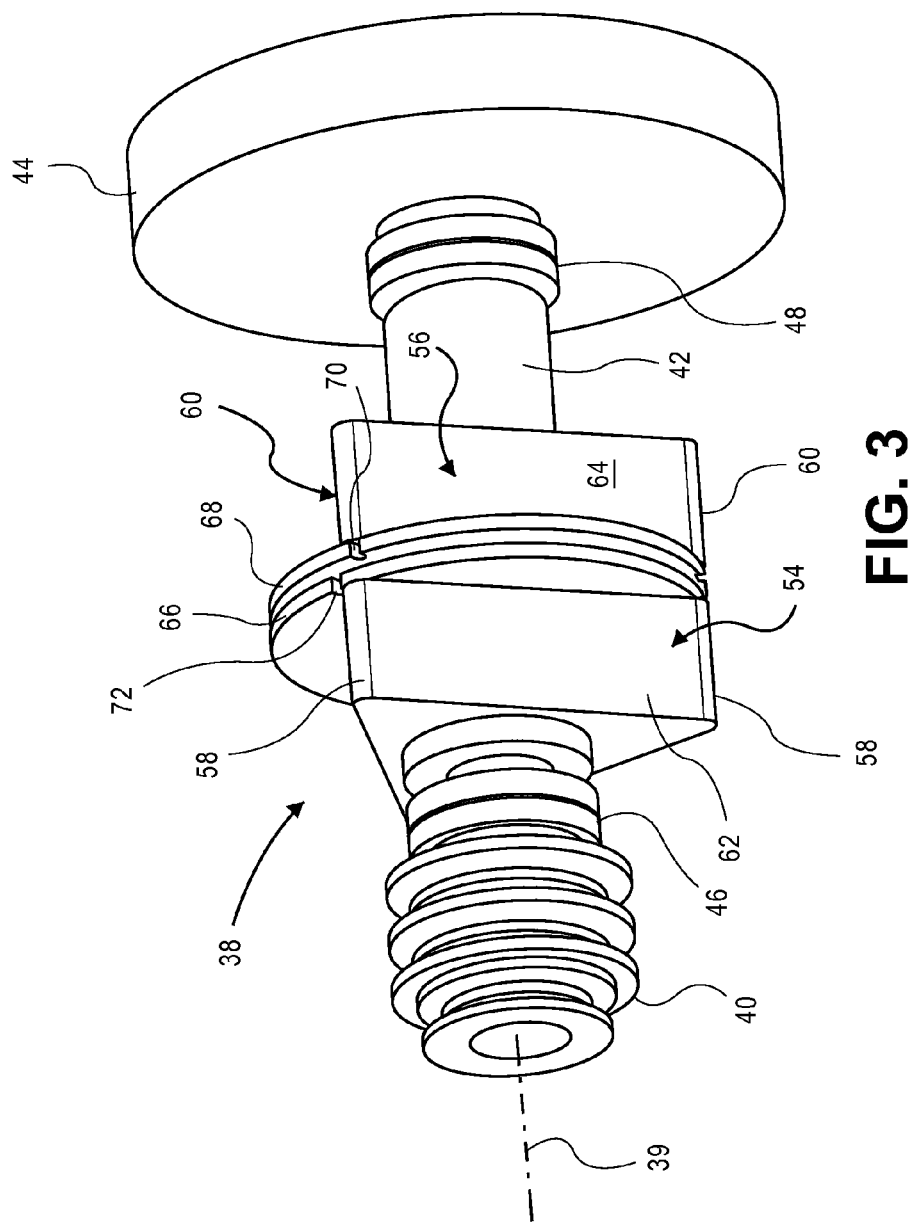
FIG. 3 is a side, perspective view of the main rotor assembly of the engine of FIG. 1.
Figure 4:
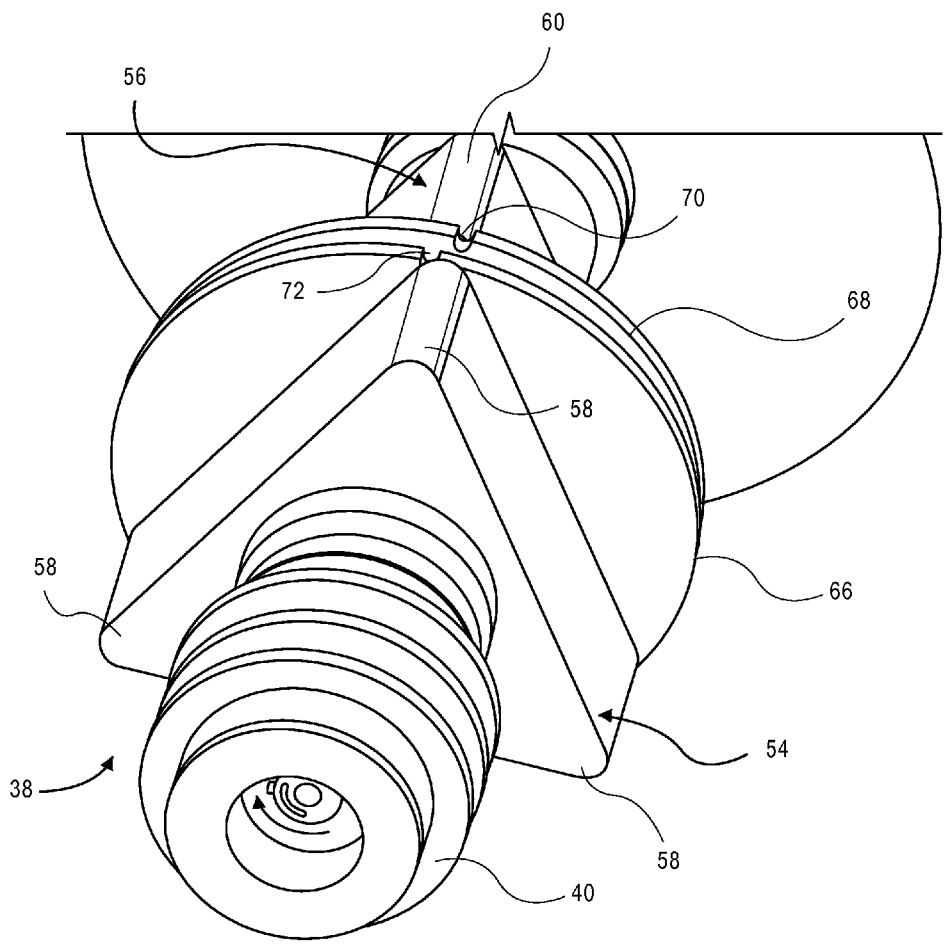
FIG. 4 is an enlarged view of a portion of the main rotor assembly of FIG. 3.

A main rotor assembly 38 is rotatably supported within the main housing assembly 12. In FIG. 1, only the auxiliary drive pulley 40 of the main rotor assembly 38 is visible, but the complete main rotor assembly 38 apart from the engine 10 is shown in FIGS. 3 and 4. The main rotor assembly 38 comprises a main shaft 42. The main shaft 42 rotates around a concentric third axis 39 which is coaxial to the first axis 26 and second axis 30. The auxiliary drive pulley 40 is mounted on a front end of the main shaft 42. On the other end, the rear end of the main shaft 42, is mounted a flywheel 44. For convenience in describing the engine 10, the side of the engine 10 on which exhaust manifold assembly 34 is mounted will be referred to as the "front" or "front side" of the engine, and the other side, i.e. the side of the engine on which the intake manifold assembly 32 is mounted will be referred to as the "rear" or "rear side" of the engine (this is consistent with the orientation in FIG. 1). A front main bearing 46 is mounted on the main shaft 42 toward the front end of the main shaft, and a rear main bearing 48 is mounted on the main shaft toward the rear end. The front main bearing 46 is received in a front main bearing housing 50 of the exhaust manifold housing (see FIG. 13). Similarly, the rear main bearing is received in a rear main bearing housing 52 of the intake manifold housing (see FIG. 10). The main bearings 46, 48 and the main bearing housings 50 and 52 rotatably support the main rotor assembly within the main housing assembly 12.

The main rotor assembly 38 also comprises a pair of rotors, a power/exhaust rotor 54 and an intake/compression rotor 56, mounted to the main shaft 42. The main shaft 42 rotates about a third axis 39 which is coaxial to the first axis 26 and the second axis 30. The power/exhaust rotor 54 is rotatably disposed within the inner wall 28 of power/exhaust bore, and the intake/compression rotor 56 is rotatably disposed within the inner wall 24 of the intake/compression bore. The power/exhaust rotor 54 and the intake/compression rotor 56 are similarly shaped, and have N (N=3 in this described embodiment) apexes 58 and 60, and N sides 62 and 64, respectively. More generally, the power/exhaust rotor 54 and the intake/compression rotor 56 have a prism-like shape having an N-sided polygonal or polygonal-like base. The shape is not exactly a prism, because a prism is a polyhedron having an N-sided polygonal base, whereas the rotors of the present invention have rounded apex portions where adjacent sides meet (as opposed to strictly linear sides meeting at sharp corners), and the sides may be curved. The rotors 54 and 56 shown in this embodiment have linear or straight sides meeting at the curved apexes, but alternatively, the sides may be concave curved (curved into the body of the rotor) or convex curved (curved out of the body of the rotor). By curving the sides of the rotors, the rotating chambers (described in more detail below) formed between each side of the rotor and the inner wall of the respective housing can be made to have a different volume. For example, the volume can be increased by using a convex curved side and the volume can be decreased by using a concave curved side.

The rotors 54 and 56 in this embodiment are shown having apex portions which are symmetrically spaced circumferentially about their respective axes. In this case, for N=3, the apexes are spaced 120 degrees from each other. For other N values, N apex portions symmetrically spaced circumferentially will be spaced 360/N degrees from each other.

As shown in FIG. 4, the power/exhaust rotor 54 and the intake/compression rotor 56 are offset by between 2 degrees and 5 degrees circumferentially, depending on the design configuration. In other words, the apexes 58 of the power/exhaust rotor 54 are leading the opposing apexes 60 of the intake/compression rotor 56 by 2-5 degrees. As described below, this enables the engine 10 to perform all four stages of an Otto cycle at the same time.

Each of the rotors 54, 56 also has a circular face plate 66, 68, respectively, on the base of the prism-like body. The power/exhaust rotor 54 has a circular face plate 66 which opposes the circular face plate 68 of the intake/compression rotor 56. The circular face plates 66, 68 are concentric to the centroids of the prism-like bodies of the respective rotors 54, 56 and each rotates about an axis which is coaxial to the third axis. The outer edge of the circular face plate 66 engages the inner wall 28 of the power/exhaust housing 22, and the outer edge of the circular face plate 68 engages the inner wall 24 of the intake/compression housing 20.

As best shown in FIG. 4, the circular face plate 68 of the intake/compression rotor 56 has N (N=3 in this embodiment) intake/compression crossover ports 70 which extend from one side of the face plate 68 to the other side of the face plate 68. Each of the N intake/compression crossover ports 70 is located near the outer radial edge of the circular face plate 68 and just to the leading side of each apex 60 of the intake/compression rotor 56. As used herein, the term "leading side" means that one element is angularly located relative to another element in the direction of rotation. Similarly, the circular face plate 66 of the power/exhaust rotor 54 has N (N=3 in this embodiment) power/exhaust crossover ports 72 which extend from one side of the face plate 66 to the other side of the face plate 66. Each of the N power/exhaust crossover ports 72 is located near the outer radial edge of the circular face plate 66 (at substantially the same radial distance from the first axis 26 as the intake/compression ports 70) and just to the trailing side of each apex of the 58 of the power/exhaust rotor 54. As used herein, the term "trailing side" means that one element is angularly located relative to another element opposite the direction of rotation. Each of the intake/compression crossover ports 70 is leading the opposing power/exhaust crossover port 72 by 5-10 degrees, depending on the configuration of the engine 10. As described below, each pair of intake/compression crossover ports 70 and power/exhaust crossover ports 72 provide a fluid path for compressed fuel and air to flow from a compression chamber 89 within the intake/compression bore to a power chamber 94 within the power/exhaust bore.

The power/exhaust rotor 54 is rotatably disposed within the power/exhaust housing 22 and rotates along with the main shaft 42 about the third axis 39 which is coaxial to the first axis 25 and the third axis 39. Preferably, the geometric center (centroid) of the cross-section of the power/exhaust rotor 54 is concentric to the third axis 39 of the main shaft 42.

The intake/compression rotor 56 is rotatably disposed within the intake/compression housing 20 and rotates along with the main shaft 42 about the third axis 39 which is coaxial to the first axis 26 and the third axis 39. Preferably, the geometric center of the cross-section of the intake/compression rotor 56 is concentric to the third axis 39 of the main shaft 42.

As better shown in FIG. 7, rotating chambers are formed by the apexes/sides of the rotors and the inner wall of the respective housing. In FIG. 7, the front side of the engine 10 is shown and the rotating power/exhaust chambers 65 formed by the sides of the power/exhaust rotor 54 and the inner wall 28 of the power/exhaust housing 22 can be seen. The apexes 58 (FIG. 3) at each end of each side of the rotors provides a seal between adjacent chambers 65. As shown in FIG. 8, a view of the rear side of the engine 10, similar rotating intake/compression chambers 67 are formed by the sides 64/apexes 60 (FIG. 3) and the inner wall 24 of the intake/compression housing 20.

Figure 12:
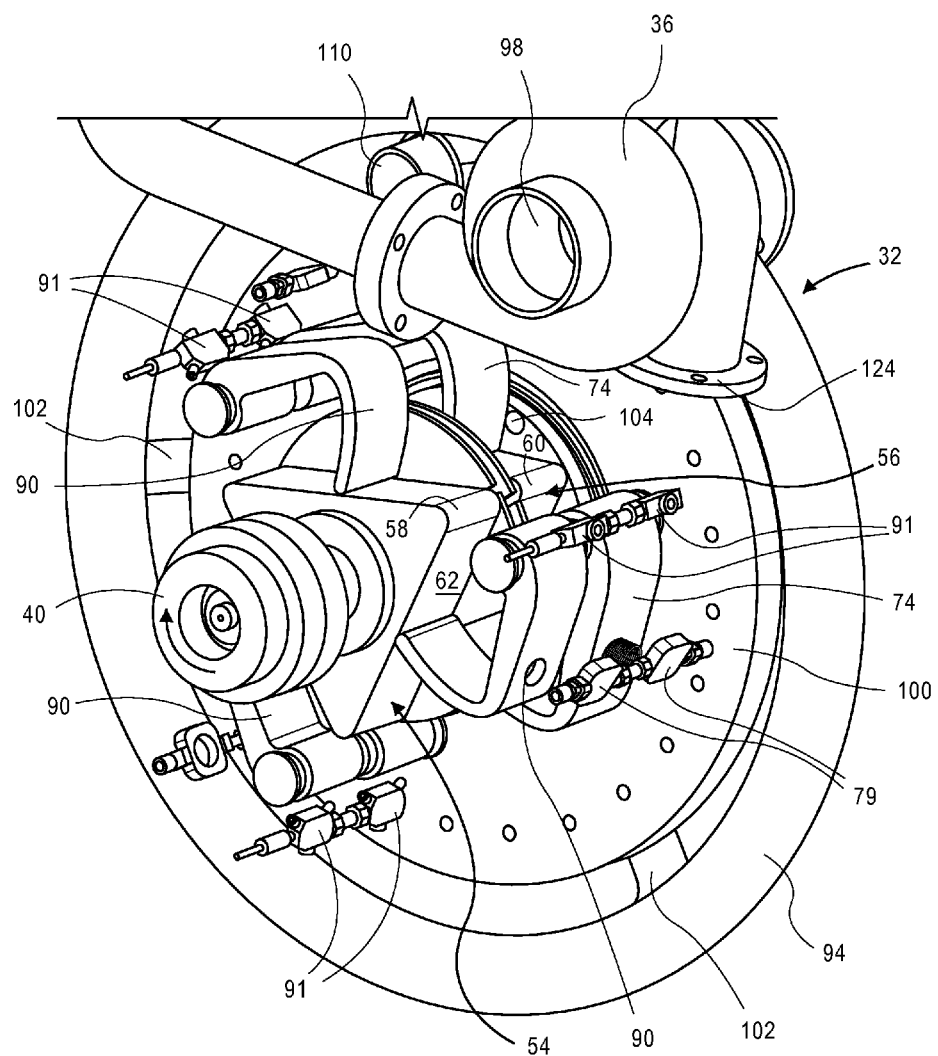
FIG. 12 is a perspective view of the inner side of the intake manifold assembly, main rotor assembly, and vane assemblies of the engine of FIG. 1.

Referring to FIGS. 8 and 12, there are N (N=3 in this embodiment) reciprocating intake/compression vanes 74 extending into the intake/compression bore through a slot in the inner wall 24 of the intake/compression housing 20. The N intake/compression vanes 74 are equally spaced circumferentially around the inner wall 24 of the intake/compression housing 20. The N intake/compression vanes 74 are shown symmetrically spaced circumferentially around the inner wall 24, but they are not required to be symmetrically spaced. Thus, for engines having other N values, the N symmetrically spaced intake/compression vanes 74 will be spaced at 360/N degrees from each other (for N=4, symmetrically spaced intake/compression vanes 74 will be spaced at 90 degrees; for N=5, the vanes 74 will be spaced at 72 degrees, and so on).

Figure 6:
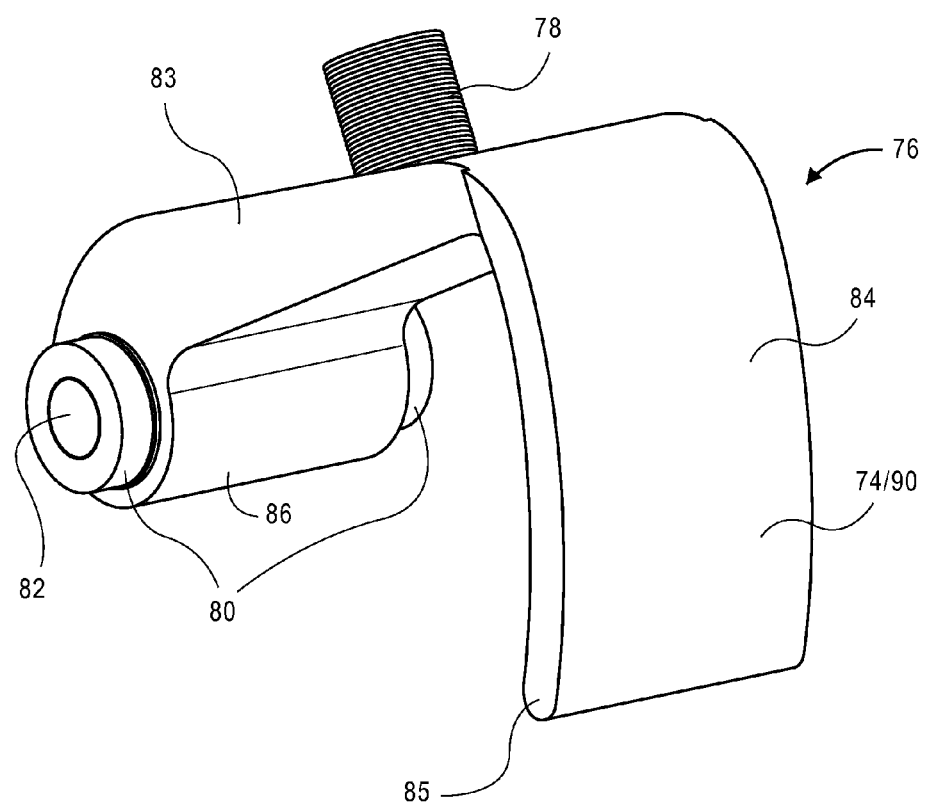
FIG. 6 is a perspective view of a vane of the engine of FIG. 1.
Figure 16:
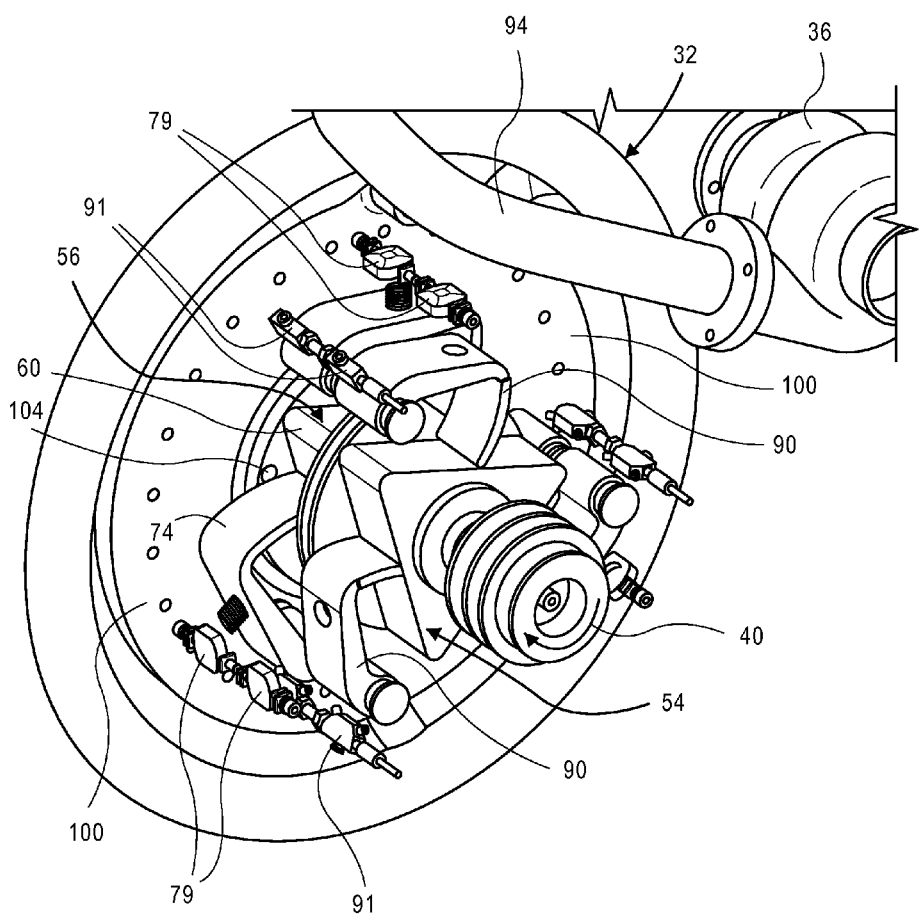
FIG. 16 is a perspective view of a portion of the engine of FIG. 1 showing the main rotor assembly and intake/compression and power/exhaust vane assemblies at a particular point of the engine cycle.
Figure 17:
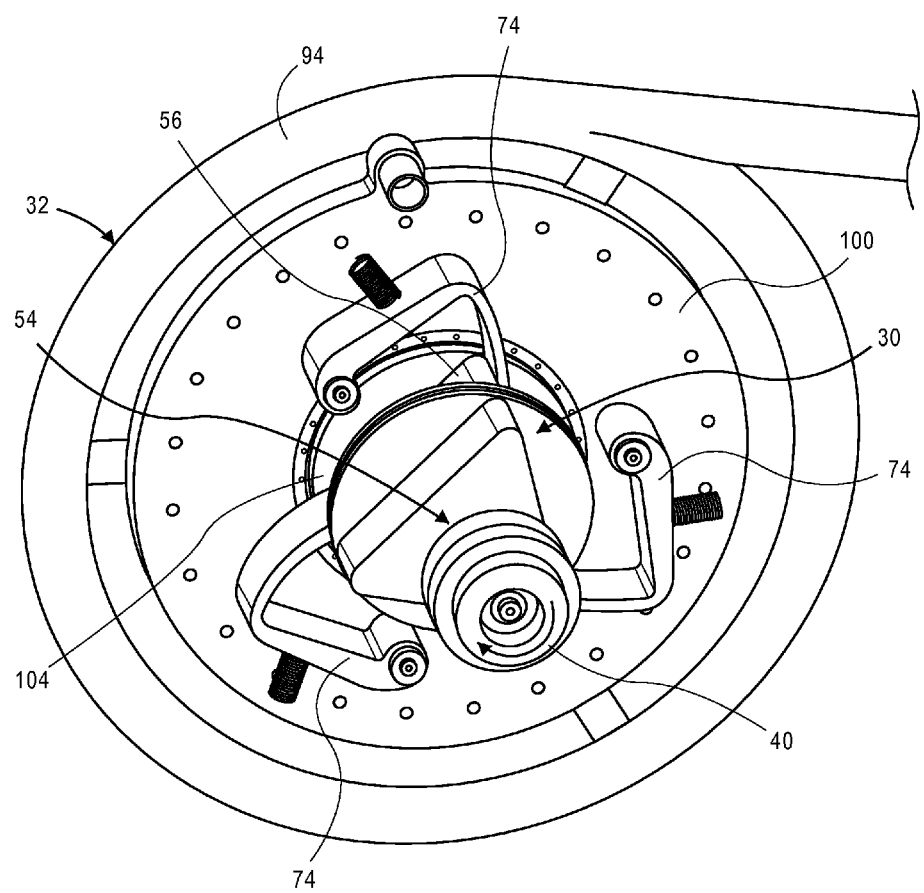
FIG. 17 is a perspective view of a portion of the engine of FIG. 1 showing the main rotor assembly and power/exhaust vane assemblies at another point of the engine cycle.

As shown in FIG. 6, each of the reciprocating intake/compression vanes 74 is part of a vane assembly 76. The vane assembly 76 comprises a vane 74, a return spring 78, support bearings 80 and a vane shaft 82. The vane 74 has a curved portion 84 which extends through the slot in the inner wall 24 and into the intake/compression bore, and a substantially straight arm 83 connected at one end to the curved portion 84 and at the other end to a journal 86 which receives the vane shaft 82. Each vane 74 also has a contact surface 85 at the extremity of the curved portion 84 which rides along the outer surface of the N-sided body of the intake/compression rotor 56 as the rotor 56 rotates, as can be seen in FIGS. 12, 16 and 17. The vane shaft 82 is mounted to the main housing assembly 12, such as by being mounted to the opposing discs 14 and 16, or alternatively, to a part of the intake/compression housing 20 and/or the power/exhaust housing 22. As better shown in FIGS. 9, 12 and 16, the other end of each of the return springs 78 bears against a respective spring saddle assembly 79. Each of the spring saddle assemblies 79 is mounted to the main housing assembly 12, such as by mounting to a part of the intake/compression housing 20 and/or the power/exhaust housing 22, or to the divider wall 96. The return spring 78 biases the vane 74 such that the contact surface 85 is biased against the outer surface of the N-sided body of the intake/compression rotor 56. This ensures that the contact surface 85 remains at least substantially in contact with the outer surface of the intake/compression rotor 56 as the rotor 56 rotates, thereby maintaining the seal between the intake side and the compression side of each vane 74. As the intake/compression rotor 56 rotates, the outer surface of the intake/compression rotor 56 that is in contact with the contact surface 85 moves radially in and out thereby pushing the vane 74 against the force of the return spring 78. The radial movement of the outer surface of the intake/compression rotor 56 that is in contact with the contact surface 85 and the force of the return spring 78 cause the intake/compression vane 74 to reciprocate in and out of the intake/compression bore as the vane 74 rotates back and forth about the axis formed by the vane shaft 82.

As can be seen in FIG. 8, each intake/compression vane 74 divides each of the N rotating intake/compression chambers 67 within the intake/compression bore into a compression chamber 89 on the trailing side in the direction of rotation of the rotors or the inner surface of the curved portion 84 of the vane 74 and an intake chamber 88 on the leading side in the direction of rotation of the rotors or the outer surface of the curved portion 84 of the vane 74, see FIG. 6.

Referring to FIGS. 7 and 12, similar to the intake/compression side of the engine 10, on the power/exhaust side of the engine 10, there are N (N=3 in this embodiment) reciprocating power/exhaust vanes 90 extending into the power/exhaust bore through a slot in the inner wall 28 of the power-exhaust housing 22. The N power/exhaust vanes 90 are equally spaced circumferentially around the inner wall 28 of the intake/compression housing 22. The N power/exhaust vanes 90 are shown symmetrically spaced circumferentially around the inner wall 28, but they are not required to be symmetrically spaced. Thus, for engines having other N values, the N symmetrically spaced power/exhaust vanes 90 will be spaced at 360/N degrees from each other (for N=4, symmetrically spaced power/exhaust vanes 90 will be spaced at 90 degrees; for N=5, the vanes 90 will be spaced at 72 degrees, and so on).

The power/exhaust vanes 90 are substantially the same as the intake/compression vanes described above, except that the power/exhaust vanes 90 have a slightly shorter diameter as measured from axis of shaft 82. Thus, as shown in FIG. 6, each of the reciprocating power/exhaust vanes 90 is part of a vane assembly 76. The vane assembly 76 comprises a vane 90, a return spring 78, support bearings 80 and a vane shaft 82. The vane 74 has a curved portion 84 which extends through the slot in the inner wall 24 and into the intake/compression bore, and a substantially straight arm connected at one end to the curved portion 84 and at the other end to a journal 86 which receives the vane shaft 82. Each vane 90 also has a contact surface 85 at the extremity of the curved portion 84 which rides along the outer surface of the N-sided body of the power/exhaust rotor 54 as the rotor 54 rotates, as can be seen in FIGS. 8, 12 and 16. The vane shaft 82 is mounted to the main housing assembly 12, such as by being mounted to the opposing discs 14 and 16, or alternatively, to a part of the intake/compression housing 20 and/or the power/exhaust housing 22. The return spring 78 biases the vane 90 such that the contact surface 85 is biased against the outer surface of the N-sided body of the power/exhaust rotor 54. This ensures that the contact surface 85 remains at least substantially in contact with the outer surface of the power/exhaust rotor 54 as the rotor 54 rotates, thereby maintaining the seal between the power side and the exhaust side of each vane 90 (described below). As the power/exhaust 54 rotates, the outer surface of the power/exhaust rotor 54 that is in contact with the contact surface 85 moves radially in and out thereby pushing the vane 90 against the force of the return spring 78. The radial movement of the outer surface of the power/exhaust rotor 54 that is in contact with the contact surface 85 and the force of the return spring 78 cause the power/exhaust vane 90 to reciprocate in and out of the power/exhaust bore as the vane 90 rotates back and forth about the axis formed by the vane shaft 82.

As can be seen in FIG. 7, each power/exhaust vane 90 divides each of the N rotating power/exhaust chambers 65 within the power/exhaust bore into an exhaust chamber 92 on the trailing side in the direction of rotation of the rotors or the inner surface of the curved portion 84 side of the vane 90 and a power chamber 94 on the leading side in the direction of rotation of the rotors or the outer surface of the curved portion 84 side of the vane 90.

As shown in FIGS. 6, 9, 12 and 16, a lube oil sprayer 91 is provided for each intake/compression and power/exhaust vane assembly 76. The lube oil sprayers 91 are mounted to the main housing assembly 12, such as by mounting them to the discs 14 or 16 or to the divider wall 96. The lube oil sprayers 91 spray oil to lubricate and cool the vanes 74 and 90, the support bearings 80, the slots in the inner walls 24 and 28, and other heat affected surfaces of the main housing assembly 12.

Referring to FIGS. 4, 5, 7, 8, and 9, the main housing assembly 12 has a vertical divider wall 96 located between, and separating, the circular face plate 66 of the power/exhaust rotor 54 and the circular face plate 68 of the intake/compression rotor 56. The vertical divider wall 96 has N crossover holes 97 which are radially located at the same radial distance from the first axis 26 as the intake/compression crossover ports 70 of the circular face plate 68 and the power/exhaust crossover ports 72 of the circular face plate 66. Each crossover hole 97 is skewed at an angle of about 35 degrees to the plane of the circular face plates 66 and 68 such that a first side of the crossover hole 97 aligns with a respective intake/compression crossover port 70 while the other side of the crossover hole 97 aligns with a respective power/exhaust crossover port 72, thereby providing a fluid path from the compression chamber 67 to the power chamber 94, when the intake/compression rotor 56 and the power/exhaust rotor 54 are at a crossover angular rotational position. When the intake/compression rotor 56 and the power/exhaust rotor 54 are not at the crossover rotational position, the divider wall 96 substantially seals the intake/compression crossover ports 70 and the power/exhaust crossover ports 72. Thus, the divider wall 96 and crossover holes 97 act as a shut-off valve and check valve that prevents air-fuel mixture from transferring or flowing back when the intake/compression crossover ports 70 and power/exhaust crossover ports 72 are not aligned with the crossover holes 97.

Figure 2:
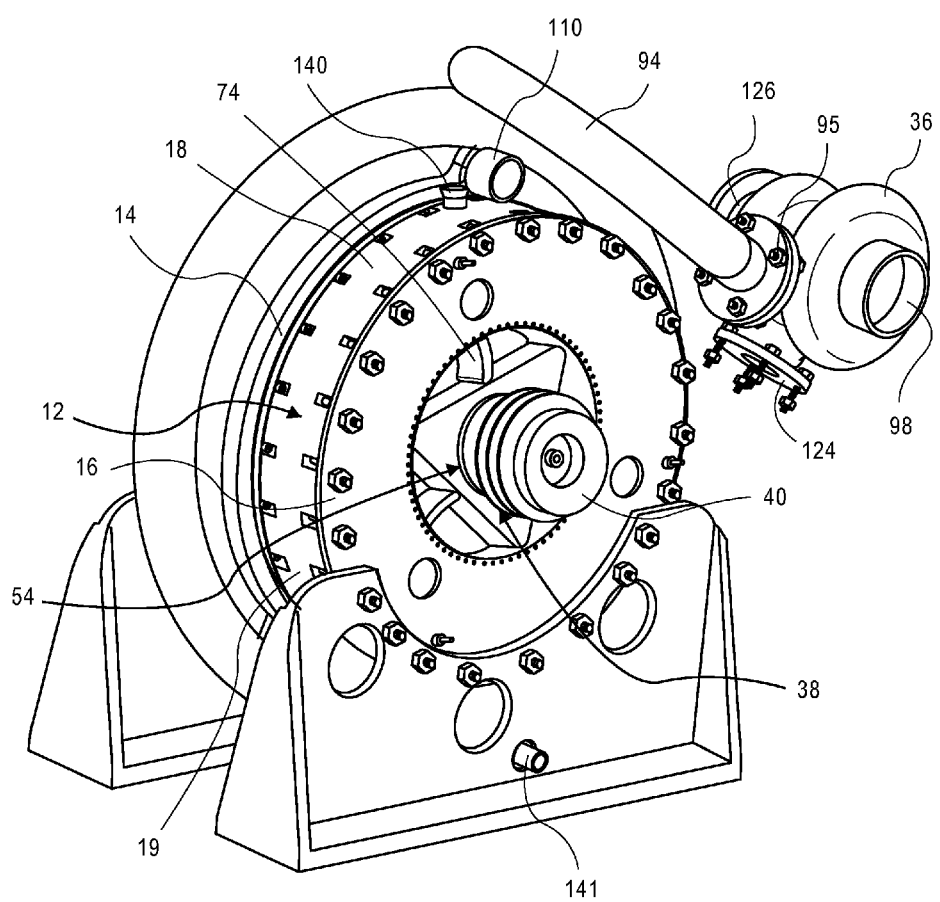
FIG. 2 is a front, perspective view of the engine of FIG. 1 with the exhaust subassembly removed.
Figure 10:
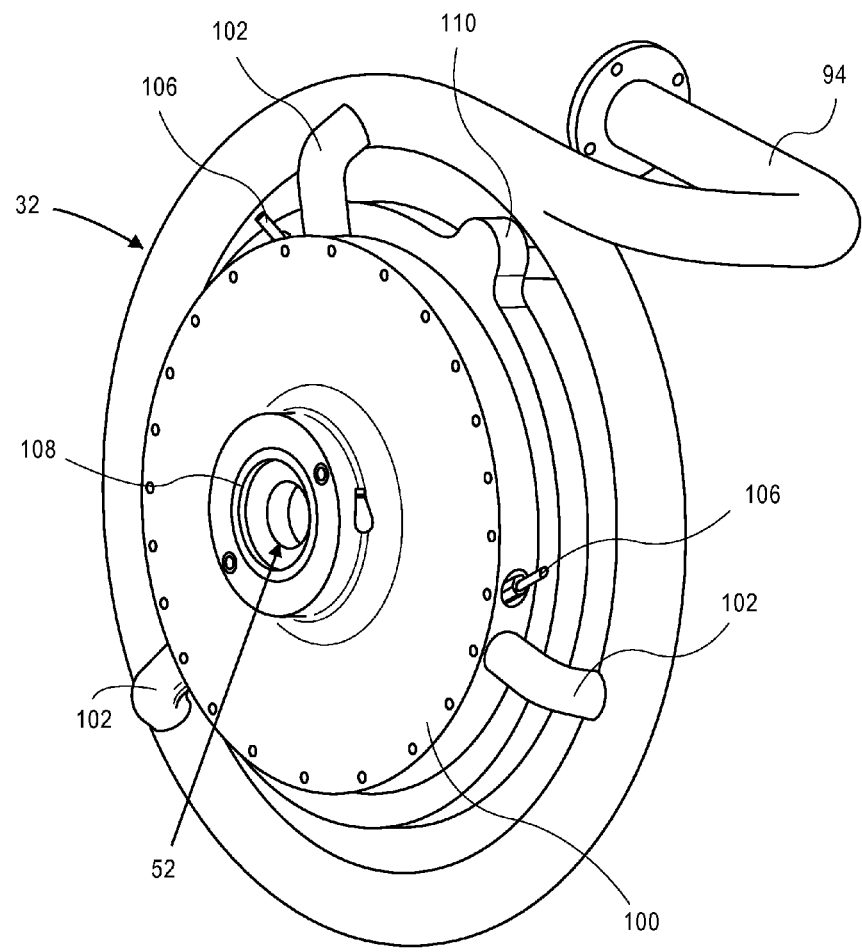
FIG. 10 is a perspective view of the outer side of the intake manifold assembly of the engine of FIG. 1.
Figure 11:
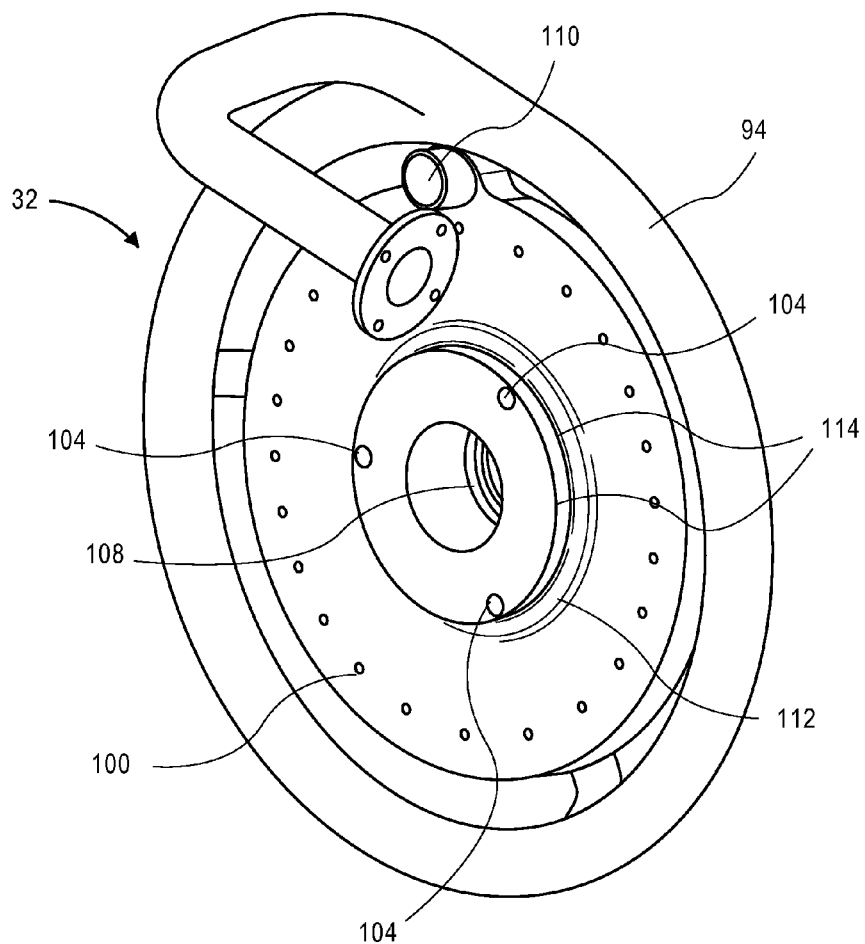
FIG. 11 is a perspective view of the inner side of the intake manifold assembly of the engine of FIG. 1.

Turning now to FIGS. 10-12, the intake manifold assembly 32 comprises a main intake pipe 94 which is connected to the air outlet 95 of the turbocharger 36 (see FIGS. 1 and 2). As shown in FIG. 2, the turbocharger 36 has an air inlet 98 which draws air from an air inlet tube (not shown) leading from an air filter (not shown). The turbocharger 36 has a compressor which compresses the inlet air and discharges at higher pressure, compressed air out of the air outlet 95 and into the main intake pipe 94. The main intake pipe 94 bends around an intake manifold plate 100 in a circular shape surrounding the intake manifold plate 100. A plurality of distribution tubes 102 (in this case 3 tubes 102) are connected to, and in fluid communication with, the main intake pipe 94 and also to the intake manifold plate 100. The intake manifold plate 100 has a plurality of intake lumens (not shown) extending from the connections with the distribution tubes 102 to N intake ports 104. Each intake port 104 is in fluid communication with a respective intake chamber 88 within the intake/compression bore of the intake/compression housing 20. Each intake port 104 is located just to the trailing side of a respective intake/compression vane 74 (as best shown in FIGS. 8, 12 and 16), which is within the compression chamber 89. The intake ports 104 may simply comprise a hole, or other suitable opening, or they may also include a nozzle and/or valve for controlling the flow of intake fluid (typically air-fuel mixture). There are two (an inner seal and an outer seal) lube oil seals 108 (see FIGS. 10 and 11) within the rear main bearing housing 52 for containing the lube oil within the engine 10.

As seen in FIG. 10, the intake manifold assembly 32 has N (in this case, N=3) fuel injectors 106 symmetrically spaced circumferentially around the intake manifold plate 100. The fuel injectors 106 have a spray nozzle which is in fluid communication with the lumens of the intake manifold plate for injecting fuel into the lumens which then mixes with the intake air. While N fuel injectors 106 are shown in this embodiment of the engine 10, more or fewer fuel injectors 106 may be used.

The intake manifold assembly 32 also has a coolant cooling system for circulating a coolant (typically a fluid such as water and/or anti-freeze) through the heat affected parts of the engine 10. The intake manifold 32 has a coolant inlet connection 110 (see FIGS. 10 and 11), a plurality of coolant lumens (not shown) and coolant distribution holes 112 within the intake manifold plate 100, and two coolant O-ring seals 114 to contain the coolant within the engine 10. The coolant lumens evenly distribute the coolant to the components of the main housing assembly 12 to cool the heat affected components, such as the intake/compression housing 20 and especially the power/exhaust housing 22 and its power/exhaust chambers 65. The coolant is pumped by a circulating pump through a coolant flow path of the engine 10 and then through a heat exchanger (such as a radiator, not shown) to cool the coolant after it has been circulated through the engine 10. The circulating pump may be driven by a belt coupled to the auxiliary drive pulley 40.

Figure 13:
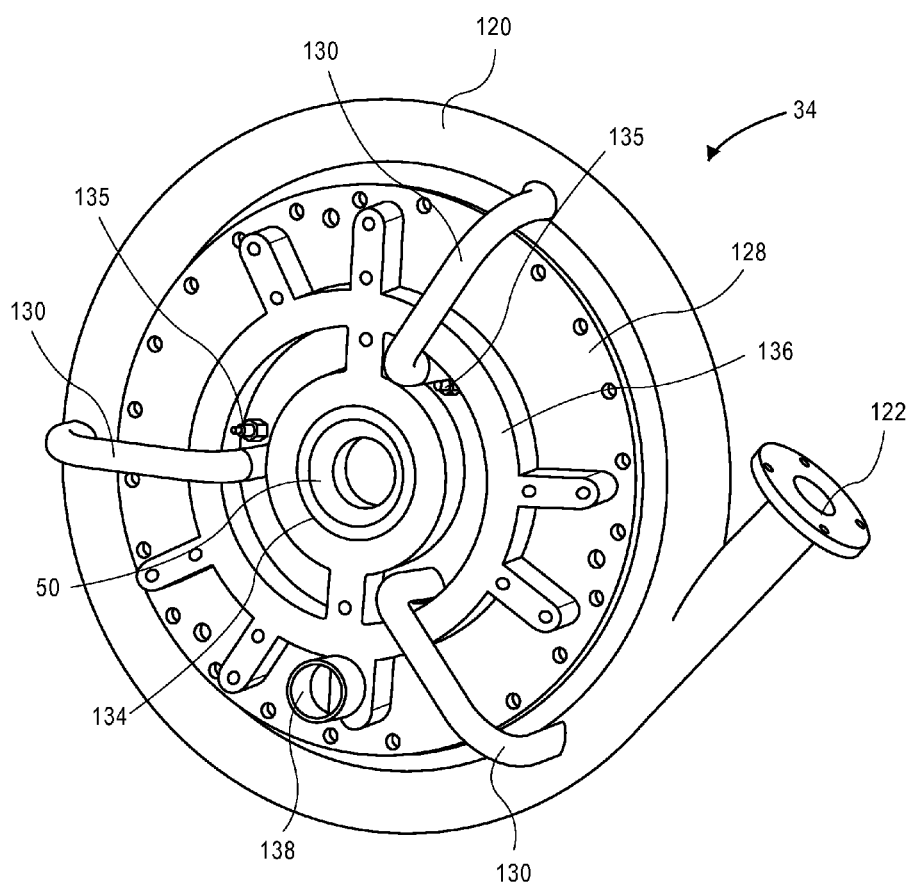
FIG. 13 is perspective view of the outer side of the exhaust manifold assembly of the engine of FIG. 1.
Figure 14:
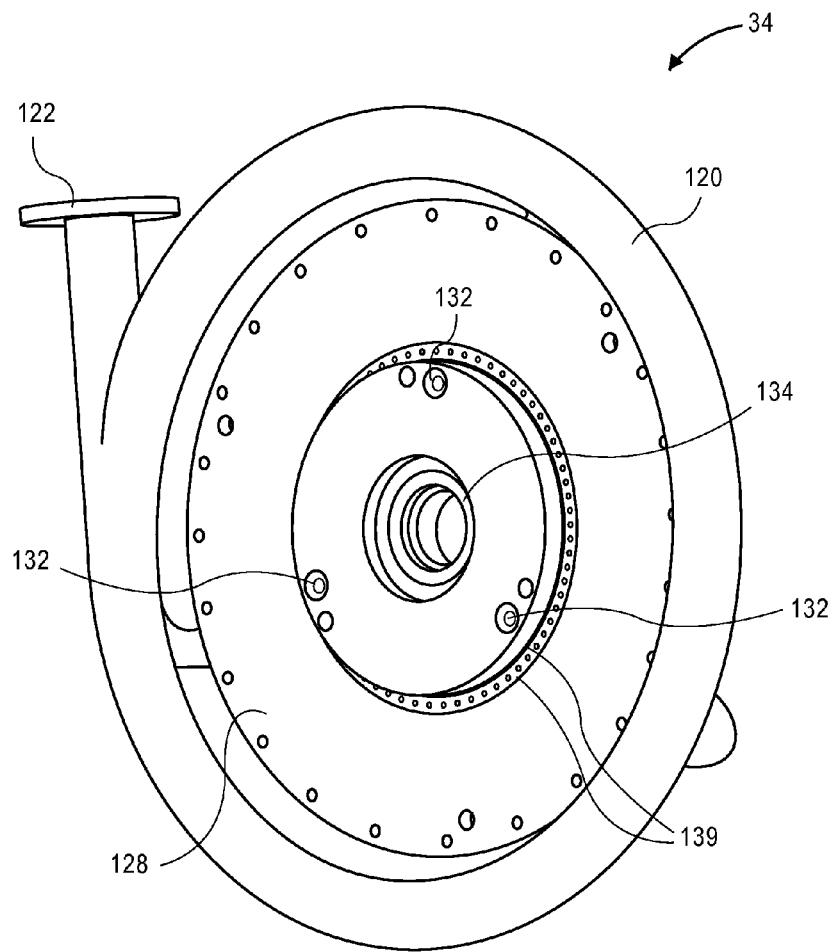
FIG. 14 is perspective view of the inner side of the exhaust manifold assembly of the engine of FIG. 1. (Please remove the top callout 128 pointing to a hole and change the designation of 138 to 139 for the O-ring seal)
Figure 15:
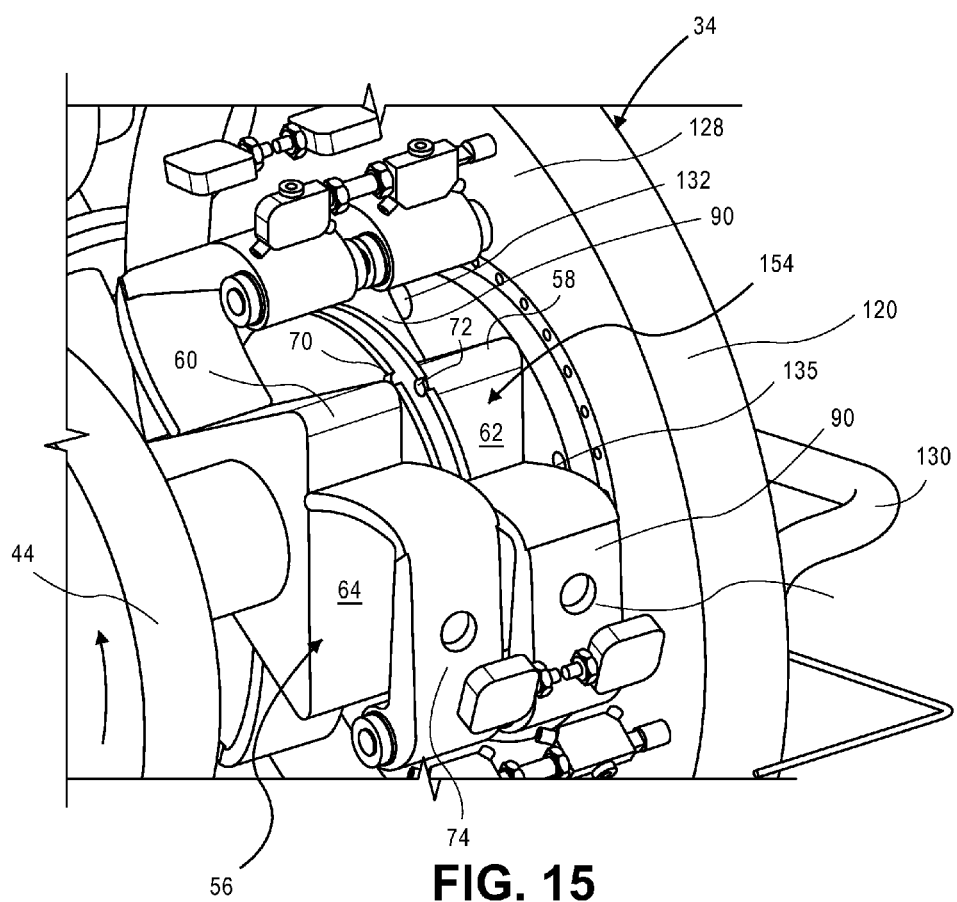
FIG. 15 is perspective view of the main rotor assembly and inner side of the exhaust manifold assembly of the engine of FIG. 1.

Referring now to FIGS. 13, 14 and 15, the exhaust manifold assembly 34 comprises a main exhaust pipe 120 which has an exhaust pipe outlet 122 which is connected to the exhaust inlet 124 of the turbocharger 36 (see FIG. 1). The exhaust side of the turbocharger 36 has an exhaust inlet 124 which receives the pressurized exhaust from the main exhaust pipe 120. The exhaust side of the turbocharger 36 has a turbine which is driven by the pressurized exhaust from the main exhaust pipe 120. The turbine is coupled to the compressor on the intake air side of the turbocharger 36 (described above with respect to the intake manifold assembly 32). Accordingly, the turbine rotates thereby driving the rotation of the compressor of the turbocharger 36 which compresses the intake air. The exhaust side of the turbocharger has a turbine outlet 126 (see FIG. 1) which is connected the remainder of the exhaust system, such as an emission controls system (e.g. catalytic converter), a noise reductions system (e.g. a muffler), and a tailpipe which sends the treated exhaust into the atmosphere. As shown, the main exhaust pipe 120 bends around an exhaust manifold plate 128 in a circular shape surrounding the exhaust manifold plate 128, but it is not required to have a circular shape, other shape may be used to reduce the gas friction is acceptable. A plurality of exhaust manifold tubes 130 (in this case 3 tubes 130) are connected to, and in fluid communication with, the exhaust manifold plate 128 and the main exhaust pipe 120. The exhaust manifold plate 128 has a plurality of exhaust lumens (not shown) extending from the connections with the exhaust manifold tubes 130 to N exhaust ports 132 (see FIGS. 13 and 14). Each exhaust port 132 is in fluid communication with a respective exhaust chamber 92 within the power/exhaust bore of the power/exhaust housing 22 (see FIG. 7). Thus, each exhaust port 132 is located just to the leading side of a respective power/exhaust vane 90 (as best shown in FIGS. 14, 15 and 16), which is within the exhaust chamber 92. The exhaust ports 132 may simply comprise a hole, or other suitable opening, or they may also include a nozzle and/or valve for controlling the flow of intake fluid (typically air-fuel mixture). There are two (an inner seal and an outer seal) lube oil seals 134 (FIGS. 13 and 14) within the front main bearing housing 50 for containing the lube oil within the engine 10.

As shown in FIG. 13, the exhaust manifold assembly 34 has N (in this case, N=3) ignition devices 135, such as a spark plug, symmetrically spaced circumferentially around the exhaust manifold plate 128. Each ignition device 135 is located just to the leading side of a respective power/exhaust vane 90 (see FIG. 15) in communication with a respective power chamber 94.

The coolant cooling system described above also extends to the exhaust manifold assembly 34. Accordingly, the exhaust manifold assembly 34 has a plurality of coolant lumens 136 within the exhaust manifold plate 128, two coolant O-ring seals 139 to contain the coolant within the engine 10, and a coolant outlet connection 138. The coolant lumens evenly distribute the coolant within the power/exhaust housing 22, and the exhaust manifold plate 128 to cool the heat affected components, such as the power/exhaust housing 22 and its power/exhaust chambers 65. The coolant flow path is as follows: coolant flows into the coolant inlet connection 110, through the plurality of coolant lumens (not shown) and coolant distribution holes within the groove 112 (see FIG. 11) within the intake manifold plate 100 through the coolant lumens 136 within the exhaust manifold plate 128, out the coolant outlet connection 138, and then to the heat exchanger and coolant circulating pump, and back to the coolant inlet connection 110, as described above.

As the engine 10 is typically an internal combustion engine, the engine 10 may have several other specifications for ensuring the proper operation and improving the reliability of the engine 10. For instance, the intake/compression rotor 56 and the power/exhaust rotor 54 may be hard coated to increase their reliability and heat resistance, and also to decrease the coefficient of friction with moving contact components. The internal surfaces and bores of the main housing assembly 12, including the intake/compression bore and the power/exhaust bore, the vanes 74 and 90 slots and the corresponding vanes 74 and 90 surfaces 84 and 85, the vertical wall surface of the intake/compression manifold plate 100 engaging the intake/compression rotor 56 and the power exhaust manifold plate 128 engaging the power/exhaust rotor 54, and the divider wall 96 may also be hard coated to increase their reliability and heat resistance, and also to decrease the coefficient of friction with moving contact components. The clearance between the stationary surfaces of the engine 10 and the engaging rotating surfaces should be minimized to no more than a maximum of 0.0010 inch. This includes, without limitation, the stationary surfaces of the intake/compression housing 20, power/exhaust housing 22, intake/compression manifold plate 100 and the power exhaust manifold plate 128 in relation to the rotating surfaces of the intake/compression rotor 56 and power/exhaust rotor 54.

The maximum rotational speed of the engine 10 may be set from 3600 rpm to 6000 rpm or even higher, depending on the robustness of the engine components.

The support bearings 80 used on the vane assemblies 76 should be heat resistant.

The turbocharger 36 should be selected to deliver the appropriate power requirements based on specific size and rotor design of the engine 10.

In addition, the material of the lubricating oil seals and coolant seals should be designed for the appropriate application and operating temperature ranges, with a reasonable degree of engineering tolerance.

The engine 10 may also include a starting system including a rechargeable battery (such as a 12 volt, lead-acid battery), a direct current motor starter and solenoid switches, electric wires and cables to operate and couple the battery to the starter. When the main solenoid switch is engaged, a pinion gear on the starter motor engages a ring gear on the flywheel 44 and rotates the engine 10 to a minimum starting rotational speed, for example, at least 500 rpm, or at least 750 rpm or at least 900 rpm. Once the engine reaches the minimum starting rotational speed, the solenoid switch is disengaged, and the starter motor disengages from the flywheel 44.

The engine 10 may also have an electronic ignition and fuel injection system for controlling the ignition and fuel flow of the engine 10. For instance, the engine 10 may have a main computer system having one or more central processing units (CPUs) comprising semiconductor microprocessors. The main computer system monitors the function of the engine 10 through various sensors and controls the timing of the actuation of the ignition devices 135. In order to monitor the function of the engine 10, the computer system may receive input signals from differently located pressure sensors, rotor speed sensors, rotor position sensors and other required sensors. If the ignition devices 135 are spark plugs or the like, the electronic ignition system also utilizes a high voltage step up coil that provides a high voltage electrical current to each of the N spark plugs of the engine 10.

The fuel injection system is operably coupled to the main computer system and includes various fuel system sensors used by the main computer system to monitor and control the delivery of fuel to the N fuel injectors 106. The fuel injection system and main computer system electronically control the N fuel injectors 106 to provide the appropriate amount of fuel and to control the timing of the fuel injection for the correct air-fuel mixture to be delivered to the intake ports 104 of the intake manifold 32.

The engine 10 may further include an electrical charging system to provide electrical power to the engine 10 and to charge the battery. The electrical charging system may include an alternator and electrical generator system driven by the auxiliary drive pulley 40.

The engine 10 may also include a circulating lubricating oil and cooling system for circulating and cooling the lube oil distributed throughout the engine 10 to lubricate and cool the heat affected components of the engine 10. The lube oil circulating and cooling system includes a plurality of lube oil lines 143, lube oil sprayers 91, a lube oil vent 140, a lube oil sump 19, a lube oil outlet 141 and various lumens within the components of the engine 10, for circulating the lube oil throughout the engine 10. A positive displacement pump is driven by the auxiliary drive pulley 40 to pump the lube oil through the lube oil system and also through a heat exchanger for cooling the lube oil.

The operation of the engine 10 will now be described with respect to the figures, in which the curved arrows indicate the direction of rotation of the main rotor assembly 38. The engine 10 is typically an internal combustion engine operating on a four-stage thermodynamic cycle substantially the same as the well-known Otto cycle. The cycle comprises an intake stage, a compression stage, a combustion-power stage and an exhaust stage. As the rotors 54 and 56 are rotating during operation of the engine 10, all four stages of the engine cycle are occurring simultaneously, with each cycle occurring in a different one of the intake/compression chambers 67, which are divided by an intake/compression vane 74 into an compression chamber 89 and an intake chamber 88, and the power/exhaust chambers 65, which are divided by a power/exhaust vane 90 into an exhaust chamber 92 and a power chamber 94. Accordingly, a full cycle for a specific control volume of air-fuel mixture within the engine 10 will be described, which will utilize one set of the N rotating chambers 67 and 65 consisting of one power/exhaust chamber 65 and one intake/compression chamber 67, with the understanding that the same stages are occurring simultaneously within each of the other sets of the N rotating chambers 67 and 65.

The engine 10 is started by engaging a main starter switch which activates the starter motor and the main solenoid switch thereby engaging the starter pinion to the ring gear of the flywheel 44. The starter motor accelerates the main rotor assembly 38 to at least 500 rpm (or the specified minimum starting rotational speed to start the operation) of the engine 10. As the engine develops speed, air is pumped from the atmosphere through the turbocharger 36, which increases the pressure of the air from the atmospheric pressure, and into the intake manifold 32. Once the engine reaches the minimum starting rotational speed, the engine 10 may now commence the four stage cycle, which will continue to power the rotation of the engine 10. At this time, the solenoid switch is disengaged, and the starter motor disengages from the flywheel 44.

Turning to FIGS. 12 and 16, the first stage of the four stage cycle is the intake stage. Air is pumped into the main intake pipe 94 of the intake manifold assembly 32 by the turbocharger 36 which increases the pressure of the air from the atmospheric pressure. Fuel is sprayed into the pressurized air in the intake manifold assembly 32 by the fuel injectors 106, and the air and fuel mix to create an air-fuel mixture (the intake fluid). As the intake/compression rotor 56 rotates, shortly after the apex 60 of the intake/compression rotor 56 passes the intake/compression vane 74 exposing the intake port 104 to the intake/compression bore, the air-fuel mixture begins to be drawn through the intake port 104 into the intake chamber 88 (see FIG. 8) on the leading side of the intake/compression vane 74. As the intake/compression rotor 56 continues to rotate, the intake chamber 88 increases in volume, until the following apex 60 passes the intake/compression vane 74, which is the end of the intake stage. At this point, the following apex 60 and side 64 (see FIG. 3) of the intake/compression rotor 56 begins to compress the air-fuel mixture just drawn into the intake chamber 88 against the trailing side of the preceding vane 74, such that this now is the compression chamber 89 on the trailing side of the preceding vane 74 (see FIGS. 8 and 15). During the compression stage, the volume of the compression chamber 89 is decreasing as the intake/compression rotor 56 continues to rotate, until the following apex 60 gets near the preceding vane 74 (see FIG. 17 which shows the intake/compression rotor 56 near the end of the compression stage). Up to this point, during the intake and compression stages, the intake/compression crossover port 70 and the power/exhaust crossover port 72 (see FIG. 18) are sealed by the divider wall 96. At this point, the intake/compression crossover port 70 lines up with the divider wall crossover hole 97, which also lines up with the power/exhaust crossover port 72, referred to as the crossover rotational position of the rotor assembly 38. While the crossover ports 70 and 72 and the crossover hole 97 see FIG. 5) are aligned, the compressed air-fuel mixture flows through the intake/compression crossover port 70, the divider wall crossover hole 97 and the power/exhaust bore crossover port 72 and into the power chamber 94 formed between the apex 58 of the power/exhaust rotor 54 and the leading side of the power/exhaust vane 90 (see FIG. 15).

Figure 18:
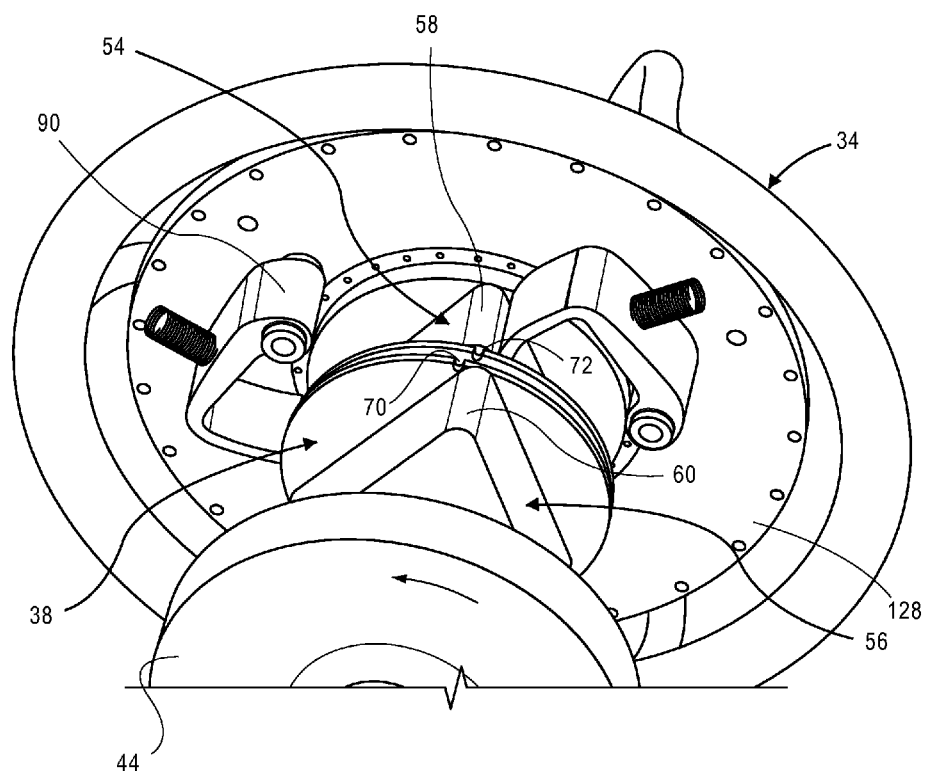
FIG. 18 is a perspective view of a portion of the engine of FIG. 1 showing the main rotor assembly and power/exhaust vane assemblies at still another point of the engine cycle.

The crossover of the air-fuel mixture occurs as the intake/compression apex 60 closely approaches the trailing side of the preceding intake/compression vane 74, and the power/exhaust apex 58 just passes the power/exhaust vane 90 (see FIG. 18 which shows the power/exhaust rotor 54 at the beginning of the power stage). This marks the beginning of the power stage. Shortly thereafter, as the power/exhaust rotor 54 rotates such that the crossover ports 70 and 72 are again sealed by the divider wall 96, the ignition device 135 in communication with the respective power chamber 94 is activated thereby igniting the air-fuel mixture and commencing the power stage. The combustion and expansion of the air-fuel mixture exerts a force on the power/exhaust rotor 54 causing a torque in the direction of rotation of the main rotor assembly 38. The volume of the power chamber 94 expands as the power/exhaust rotor 54 rotates until the following apex 58 of the power/exhaust rotor 54 passes the power/exhaust vane 90. At this point, the combusted air-fuel mixture is now in the exhaust chamber 92 formed by the following apex 58 and the trailing side of the power/exhaust vane 54 (see FIGS. 7, 15 and 18). As the power/exhaust rotor 54 continues to rotate, the volume of the exhaust chamber 92 decreases, and the combusted air-fuel mixture is compressed against the trailing side of the power/exhaust vane 90, thereby forcing the combusted fluid out of the exhaust port 132 (see FIG. 14). The exhaust stage continues until the following apex reaches the power/exhaust vane 90.

The exhaust gases travel through the exhaust manifold assembly 34, through the main exhaust pipe 120 and the exhaust pipe outlet 122 and into the exhaust inlet 124 of the turbocharger 36 (see FIGS. 12-14). The exhaust gases drive the turbine of the turbocharger, which in turn drives the compressor of the turbocharger 36 to compress the intake air.

As mentioned above, the four stages of a thermodynamic cycle are occurring at the same time as the intake/compression rotor and power/exhaust rotor rotate. More specifically, as the intake stage is occurring in the intake chamber 88 on the leading side of each intake/compression vane 74, the compression stage is occurring in the compression chamber 89 on the trailing side of each intake/compression vane 74. Simultaneously to the intake stage and compression stage occurring within the intake chamber 88 and compression chamber 89 of the intake/compression bore, the combustion-power stage is occurring in the power chamber 94 on the leading side of each power/exhaust vane 90 at the same time the exhaust stage is occurring in the exhaust chamber 92 on the trailing side of each power/exhaust vane 90. The intake/compression rotor 56 and power/exhaust rotor 54 rotate through 1/N rotation (360/N degrees) to complete each stage. Because the stages are occurring simultaneously in the N divided chambers for each stage, N cycles occur each 1/N rotation of the rotors. Therefore, upon a full rotation (revolution) of the rotors, N cycles occur in each N divided chambers, such that N times N total cycles occur for each full rotation of the rotor. Therefore, for the engine 10 having N=3, three cycles occur each ⅓ rotation (120 degrees), and 9 cycles occur per revolution of the main rotor assembly 38; for an engine in which N=4, four cycles occur each ¼ rotation (90 degrees), and 16 cycles occur per revolution of the rotors; and so on for various N values.

Figure 19:
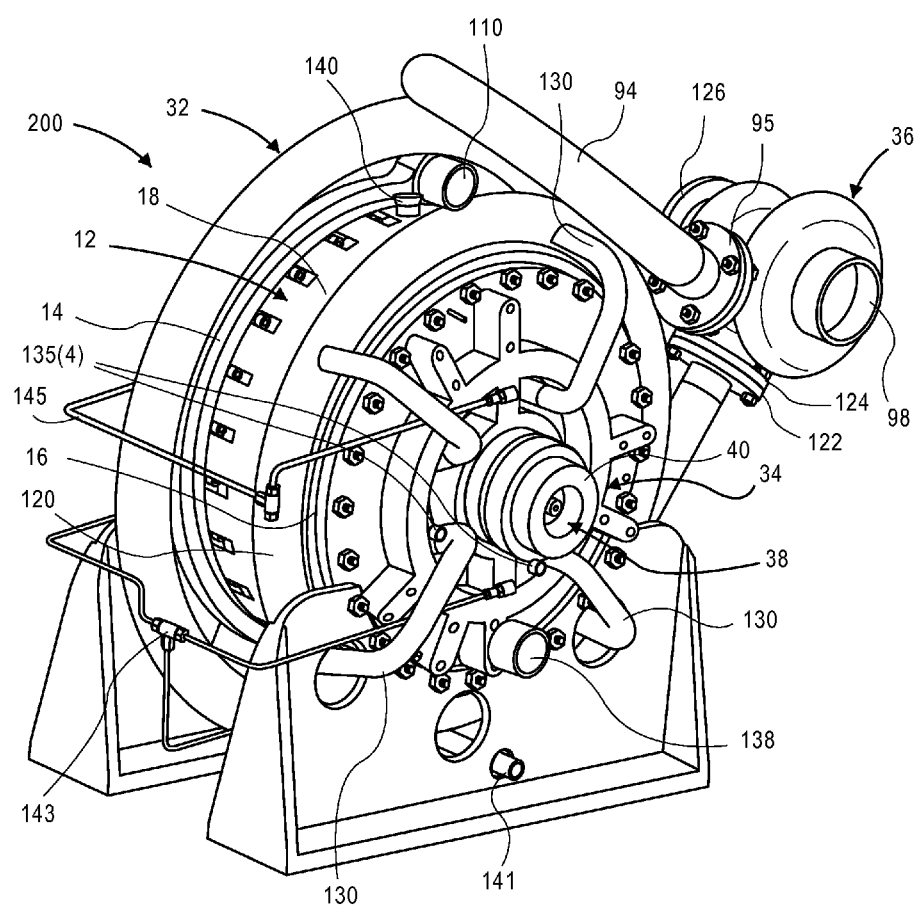
FIG. 19 is a front, perspective view of an engine according to another embodiment of the present invention.
Figure 20:
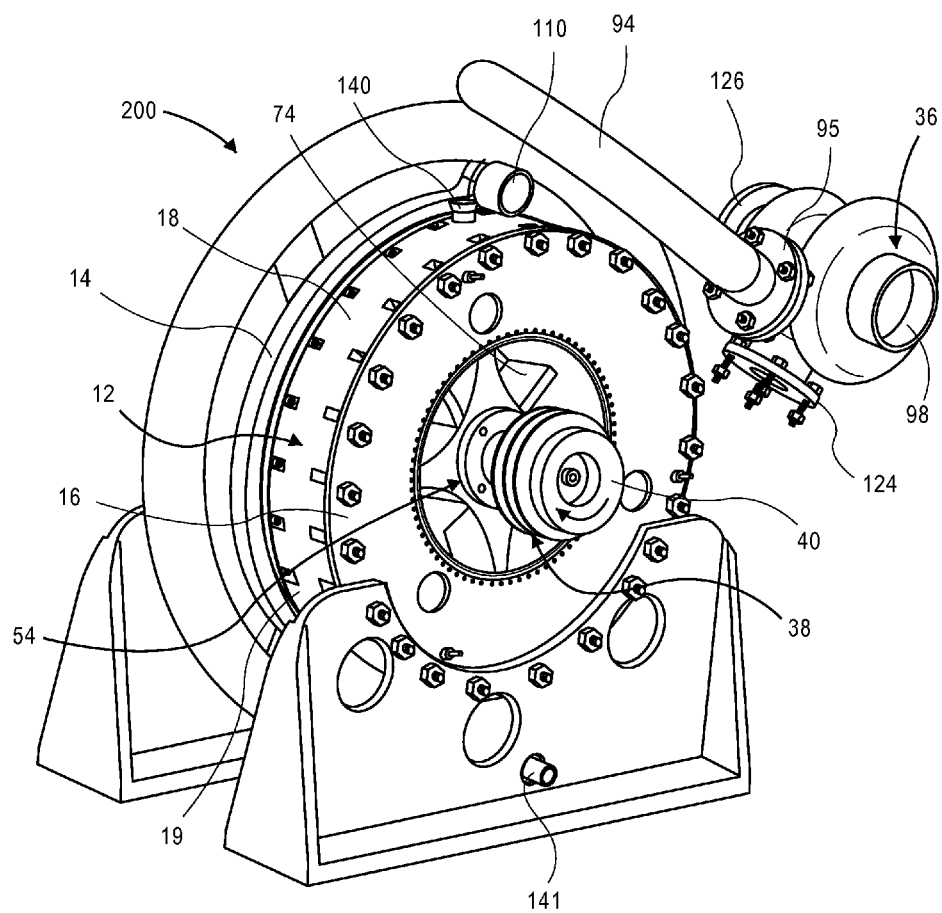
FIG. 20 is a front, perspective view of the engine of FIG. 17 with the exhaust subassembly removed.

Referring now to FIGS. 19 and 20, an engine 200 according to another embodiment of the present invention is shown. The engine 200 is similar to the engine 10 described above, except that N=4 for the engine 200. Accordingly, all of the description above with respect to the engine 10 applies equally for the engine 200, with N=4, and any other appropriate changes for an engine having N=4, instead of N=3. As can be seen in FIG. 20, the power/exhaust rotor 54 has four apexes 58 and four sides 62, and the intake/compression rotor 56 is similarly shaped with four apexes 60 and four sides 64. Here, the sides 62 and sides 64 are not straight as in the sides of the rotors shown for the engine 10 described above (however, engine 10 may also utilize concave curved sides 62 and 64), but are instead concave curved (curved into the body of the rotor). The concave curved sides 62 and 64 increase the volume of the N (N=4) rotating intake/compression chambers 67 and the N rotating power/exhaust chambers 65 over the volumes that result from straight sides 62 and 64.

The rotors 54 and 56 in this embodiment are shown having apex portions which are symmetrically spaced circumferentially about their respective axes. In this case, for N=4, the apexes are spaced 90 degrees from each other.

The operation of the engine 200 is substantially the same as the operation of the engine 10 described above, except that with N=4, 4 Otto cycles occur each ¼ rotation of the main rotor assembly 38. Therefore, upon a full rotation (revolution) of the main rotor assembly 38, 4 cycles occur in each of the 4 pairs of divided chambers, such that 4 times 4 total cycles, a total of 16 cycles, occur for each full rotation of the main rotor assembly 38.

Figure 21:
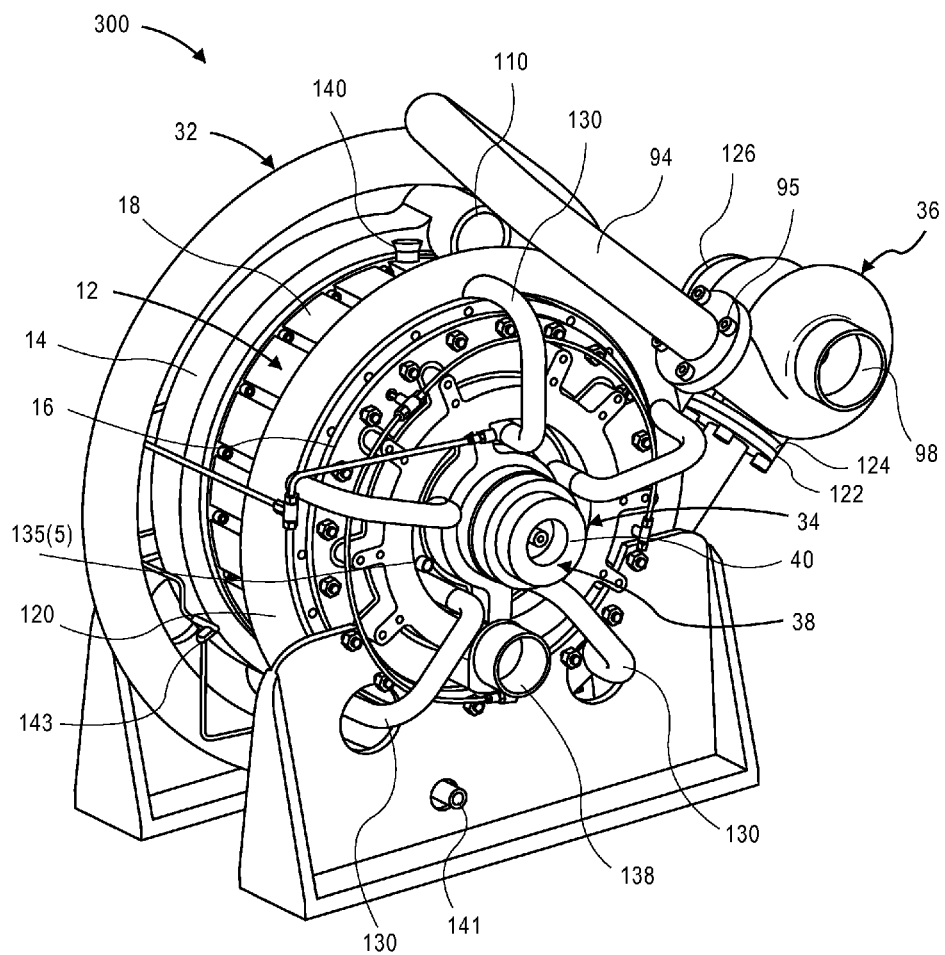
FIG. 21 is a front, perspective view of an engine according to still another embodiment of the present invention.
Figure 22:
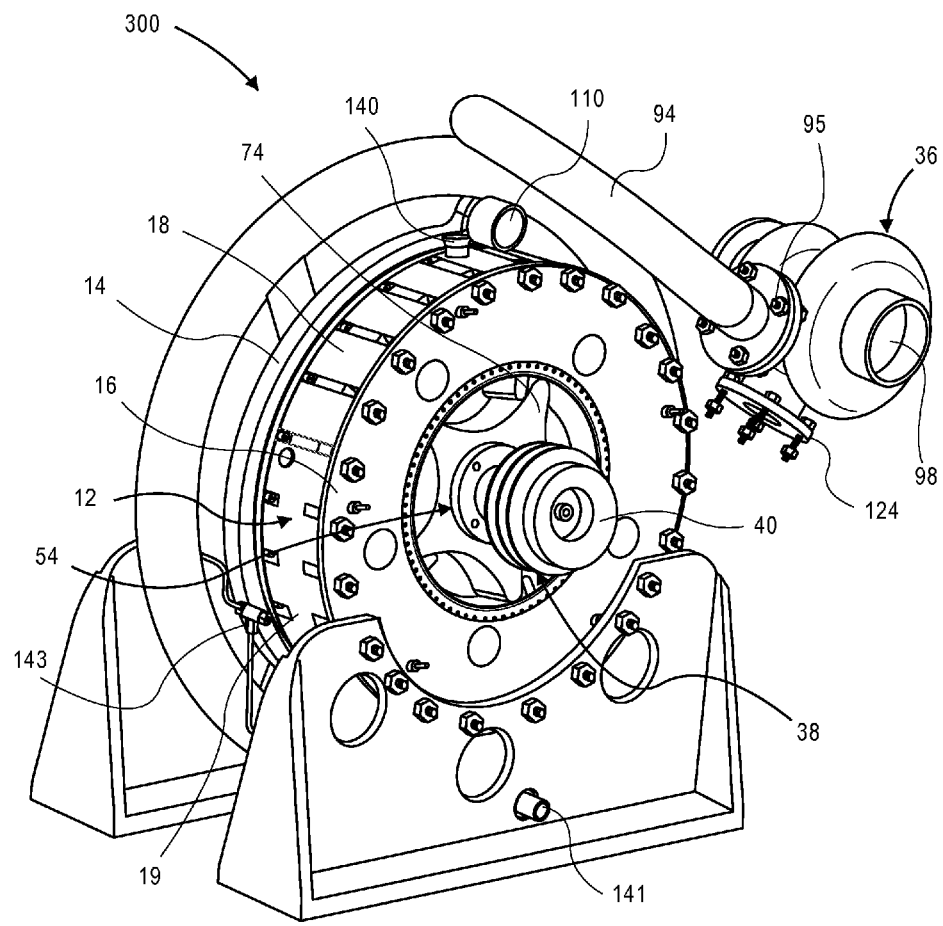
FIG. 22 is a front, perspective view of the engine of FIG. 19 with the exhaust subassembly removed.

Referring now to FIGS. 21 and 22, an engine 300 according to another embodiment of the present invention is shown. The engine 300 is similar to the engines 10 and 200 described above, except that N=5 for the engine 300. Accordingly, all of the description above with respect to the engines 10 and 200 applies equally for the engine 300, with N=5, and any other appropriate changes for an engine having N=5, instead of N=3 or N=4. As can be seen in FIG. 22, the power/exhaust rotor 54 has five apexes 58 and fives sides 62, and the intake/compression rotor 56 is similarly shaped with five apexes 60 and five sides 64. Like the engine 200, the sides 62 and sides 64 are not straight as in the sides of the rotors for the engine 10 described above, but are instead concave curved (curved into the body of the rotor). The concave curved sides 62 and 64 increase the volume of the N (N=5) rotating intake/compression chambers 67 and the N rotating power/exhaust chambers 65 over the volumes that result from straight sides 62 and 64.

The rotors 54 and 56 in this embodiment are shown having apex portions which are symmetrically spaced circumferentially about their respective axes. In this case, for N=5, the apexes are spaced 72 degrees from each other.

The operation of the engine 300 is substantially the same as the operation of the engines 10 and 200 described above, except that with N=5, 5 Otto cycles occur each ⅕ rotation of the main rotor assembly 38. Therefore, upon a full rotation (revolution) of the main rotor assembly 38, 5 cycles occur in each of the 5 pairs of divided chambers 65 and 67, such that 5 times 5 total cycles, a total of 25 cycles, occur for each full rotation of the main rotor assembly 38.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. An engine comprising:
an intake/compression housing having an intake/compression bore, the intake/compression bore having an intake/compression cylindrical inner wall having a first axis, the intake/compression housing having N intake ports in fluid communication with the intake/compression bore, wherein N is an integer greater than 2;
a power/exhaust housing having a power/exhaust bore opposed to the intake/compression bore and having a power/exhaust cylindrical inner wall having a second axis coaxial to the first axis, the power/exhaust housing having N exhaust ports in fluid communication with the power/exhaust bore;
an intake/compression rotor disposed within the intake/compression bore and rotatable relative to the intake/compression bore about a third axis of rotation which is coaxial to the first axis, the intake/compression rotor having N sides and N apex portions which engage the intake/compression cylindrical inner wall and the intake/compression rotor having an intake/compression face plate which includes N intake/compression crossover ports;
N reciprocating intake/compression vanes extending into the intake/compression bore through respective intake/compression slots in the intake/compression cylindrical inner wall, the N reciprocating intake/compression vanes spaced circumferentially around the intake/compression cylindrical inner wall, the N reciprocating intake/compression vanes each having a contact surface which contacts an outer surface of the intake/compression rotor, the N reciprocating intake/compression vanes configured to reciprocate in and out of the intake/compression bore as the intake/compression rotor rotates about the third axis;
a power/exhaust rotor disposed within the power/exhaust bore and rotatable relative to the power/exhaust bore about a fourth axis of rotation which is coaxial to the first axis, the power/exhaust rotor having N sides and N apex portions which engage the power/exhaust cylindrical inner wall and the power/exhaust rotor having a power/exhaust face plate which includes N power/exhaust crossover ports; and
N reciprocating power/exhaust vanes extending into the power/exhaust bore through respective power/exhaust vane slots in the power/exhaust cylindrical inner wall, the N reciprocating power/exhaust vanes spaced circumferentially around the power/exhaust cylindrical inner wall, the N reciprocating power/exhaust vanes each having a contact surface which contacts an outer surface of the power/exhaust rotor, the N reciprocating power/exhaust vanes configured to reciprocate in and out of the power/exhaust bore as the power/exhaust rotor rotates about the fourth axis.

2. The engine of claim 1, wherein:
the N apex portions of the intake/compression rotor are substantially symmetrically spaced circumferentially about the third axis; and
the N apex portions of the power/exhaust rotor are substantially symmetrically spaced circumferentially about the fourth axis.

3. The engine of claim 1, wherein:
the N reciprocating intake/compression vanes are substantially symmetrically spaced circumferentially around the intake/compression cylindrical inner wall; and the N reciprocating power/exhaust vanes are substantially symmetrically spaced circumferentially around the power/exhaust cylindrical inner wall.

4. The engine of claim 1, wherein:
the N apex portions of the intake/compression rotor are substantially symmetrically spaced circumferentially about the third axis;
the N apex portions of the power/exhaust rotor are substantially symmetrically spaced circumferentially about the fourth axis;
the N reciprocating intake/compression vanes are substantially symmetrically spaced circumferentially around the intake/compression cylindrical inner wall; and
the N reciprocating power/exhaust vanes are substantially symmetrically spaced circumferentially around the power/exhaust cylindrical inner wall.

5. The engine of claim 1, wherein N is in a range between 3 to 12, inclusive.

6. The engine of claim 1, wherein:
the engine utilizes a four stage thermodynamic cycle include an intake stage, a compression stage, a combustion-power stage and an exhaust stage;
the intake stage occurring on a first side of each one of the N reciprocating intake/compression vanes and the compression stage occurring substantially simultaneously on a second side of each one of the N reciprocating intake/compression vanes; and
the combustion-power stage occurring on a first side of each one of the N reciprocating power/exhaust vanes and the exhaust stage occurring substantially simultaneously on a second side of each one of the N reciprocating power/exhaust vanes.

7. The engine of claim 6, further comprising a divider wall between the intake/compression bore and the power/exhaust bore, the divider wall having a plurality of divider crossover holes which the divider crossover holes are configured to align with the N intake/compression crossover ports and the N power/exhaust crossover ports at a crossover rotational position of the intake/compression rotor and the power/exhaust rotor which occurs after the compression stage, thereby allowing a transfer of fluid from the intake/compression bore, through the N intake/compression crossover ports and the divider crossover ports into the N power/exhaust crossover ports, and into the power/exhaust bore, and the divider wall seals the N intake/compression crossover ports and the N power/exhaust crossover ports when the intake/compression rotor and the power/exhaust rotor are not at the crossover rotational position.

8. The engine of claim 1, further comprising:
N ignition devices, each one of the N ignition devices are in communication with the power/exhaust bore;
an ignition device controller operably coupled to each of the N ignition devices, and configured to activate the N ignition devices when the power/exhaust rotor is at an ignition rotational position wherein the N exhaust/rotor crossover ports are at a rotational angle slightly after one of the divider crossover holes in a direction of operating rotation of the power/exhaust rotor.

9. The engine of claim 1,
wherein the engine utilizes a four stage thermodynamic cycle include an intake stage, a compression stage, a combustion-power stage and an exhaust stage, the intake stage occurring on a first side of each one of the N reciprocating intake/compression vanes, the compression stage occurring on a second side of each one of the N intake/compression vanes, the combustion-power stage occurring on a first side of each one of the N reciprocating power/exhaust vanes and the exhaust stage occurring on a second side of each one of the reciprocating power/exhaust vanes;

wherein each one of the intake ports is configured to transfer intake fluid into the intake/compression bore on the first side of a respective one of the N reciprocating intake/compression vanes, and wherein the N intake ports, the N reciprocating intake/compression vanes and the intake/compression rotor are configured such that the intake stage commences after each apex portion of the intake/compression rotor rotates past the contact surface of a respective one of the N reciprocating intake/compression vanes, such that each one of the intake ports is not blocked by the intake/compression rotor;

wherein each one of the exhaust ports is configured to transfer exhaust fluid from the power/exhaust bore on the second side of a respective one of the N reciprocating power/exhaust vanes;

wherein the N exhaust ports, the N reciprocating power/exhaust vanes and the power/exhaust rotor are configured such that the exhaust stage commences after each apex portion of the power/exhaust rotor rotates past the contact surface of a respective one of the N reciprocating power/exhaust vanes, such that each one of the exhaust ports is not blocked by the power/exhaust rotor;

further comprising a divider wall between the intake/compression bore and the power/exhaust bore, the divider wall having a plurality of divider crossover holes which the plurality of divider crossover holes are configured to align with the N intake/compression crossover ports and the N power/exhaust crossover ports at a crossover rotational position of the intake/compression rotor and the power/exhaust rotor which occurs after the compression stage, thereby allowing a transfer of fluid from the intake/compression bore, through the N intake/compression crossover ports and the plurality of divider crossover ports into the N power/exhaust crossover ports, and into the power/exhaust bore, and the divider wall seals the N intake/compression crossover ports and N the power/exhaust crossover ports when the intake/compression rotor and the power/exhaust rotor are not at the crossover rotational position;

wherein the divider wall, the N intake/compression crossover ports and the power/exhaust crossover ports are configured such that the compression stage occurs when the intake/compression rotor and the power/exhaust rotor are not at the crossover rotational position such that the N intake/compression crossover ports and the N power/exhaust crossover ports are sealed by the divider wall;

wherein the divider wall, the N intake/compression crossover ports and the N power/exhaust crossover ports are configured such that the combustion-power stage commences immediately after the intake/compression rotor and the power/exhaust rotor pass the crossover rotational position such that the N intake/compression crossover ports and the N power/exhaust crossover ports are sealed by the divider wall;

further comprising N ignition devices, each one of the N ignition device are in communication with the power/exhaust bore; and further comprising an ignition device controller operably coupled to each one of the N ignition devices, and configured to activate the N ignition devices when the power/exhaust rotor is at an ignition rotational position wherein the N exhaust/rotor crossover ports are at a rotational angle slightly after one of the plurality of divider crossover holes in a direction of operating rotation of the power/exhaust rotor.

10. The engine of claim 1, further comprising a cooling system which circulates cooling fluid to the power/exhaust housing.

11. The engine of claim 1, wherein the power/exhaust bore is hard coated.

12. The engine of claim 1, further comprising a turbocharger and an intake manifold, the intake manifold in fluid communication with each of the intake ports and the turbocharger in fluid communication with the intake manifold.

13. The engine of claim 12, further comprising:
fuel injectors in fluid communication with the intake manifold.

14. The engine of claim 12, further comprising an exhaust manifold in fluid communication with each of the exhaust ports, and wherein a drive turbine of the turbocharger is in fluid communication with the exhaust manifold.

15. The engine of claim 1, further comprising a lubricating system configured to pump a lubricating fluid to bearings and sliding surfaces of the engine.

16. The engine of claim 1, wherein the intake/compression rotor is substantially in the shape of a prism, and the power/exhaust rotor is substantially in the shape of a prism.

17. An engine comprising:
an intake/compression housing having an intake/compression bore, the intake/compression bore having an intake/compression cylindrical inner wall having a first axis, the intake/compression housing having N intake ports in fluid communication with the intake/compression bore, wherein N is an integer greater than 2;
a power/exhaust housing having a power/exhaust bore and a power/exhaust cylindrical inner wall having a second axis coaxial to the first axis, the power/exhaust housing having N exhaust ports in fluid communication with the power/exhaust bore;
an intake/compression rotor disposed within the intake/compression bore and rotatable relative to the intake/compression bore about a third axis of rotation which is coaxial to the first axis, the intake/compression rotor having N apex portions which engage the intake/compression cylindrical inner wall and the intake/compression rotor having an intake/compression face plate which includes N intake/compression crossover ports;
N reciprocating intake/compression vanes extending into the intake/compression bore through respective intake/compression slots in the intake/compression cylindrical inner wall, the N reciprocating intake/compression vanes spaced circumferentially around the intake/compression cylindrical inner wall, the N reciprocating intake/compression vanes each having a contact surface which contacts an outer surface of the intake/compression rotor, the N reciprocating intake/compression vanes configured to reciprocate in and out of the intake/compression bore as the intake/compression rotor rotates about the third axis;
a power/exhaust rotor disposed within the power/exhaust bore and rotatable relative to the power/exhaust bore about a fourth axis of rotation which is coaxial to the first axis, the power/exhaust rotor having N apex portions which engage the power/exhaust cylindrical inner wall and the power/exhaust rotor having a power/exhaust face plate which includes N power/exhaust crossover ports; and
N reciprocating power/exhaust vanes extending into the power/exhaust bore through respective power/exhaust vane slots in the power/exhaust cylindrical inner wall, the N reciprocating power/exhaust vanes spaced circumferentially around the power/exhaust cylindrical inner wall, the N reciprocating power/exhaust vanes each having a contact surface which contacts an outer surface of the power/exhaust rotor, the N reciprocating power/exhaust vanes configured to reciprocate in and out of the power/exhaust bore as the power/exhaust rotor rotates about the fourth axis.

18. An engine comprising:
an intake/compression housing having an intake/compression bore, the intake/compression bore having an intake/compression cylindrical inner wall having a first axis, the intake/compression housing having N intake ports in fluid communication with the intake/compression bore, wherein N is an integer greater than 2;
a power/exhaust housing having a power/exhaust bore and a power/exhaust cylindrical inner wall having a second axis coaxial to the first axis, the power/exhaust housing having N exhaust ports in fluid communication with the power/exhaust bore;
an intake/compression rotor disposed within the intake/compression bore and rotatable relative to the intake/compression bore about a third axis of rotation which is coaxial to the first axis, the intake/compression rotor having N apex portions which engage the intake/compression cylindrical inner wall and the intake/compression rotor having an intake/compression face plate which includes N intake/compression crossover ports;
N reciprocating intake/compression vanes extending into the intake/compression bore through respective intake/compression slots in the intake/compression cylindrical inner wall, the N reciprocating intake/compression vanes each having a contact surface which contacts an outer surface of the intake/compression rotor, the N reciprocating intake/compression vanes configured to reciprocate in and out of the intake/compression bore as the intake/compression rotor rotates about the third axis;
a power/exhaust rotor disposed within the power/exhaust bore and rotatable relative to the power/exhaust bore about a fourth axis of rotation which is coaxial to the first axis, the power/exhaust rotor having N apex portions which engage the power/exhaust cylindrical inner wall and the power/exhaust rotor having a power/exhaust face plate which includes N power/exhaust crossover ports; and
N reciprocating power/exhaust vanes extending into the power/exhaust bore through respective power/exhaust vane slots in the power/exhaust cylindrical inner wall, the N reciprocating power/exhaust vanes each having a contact surface which contacts an outer surface of the power/exhaust rotor, the N reciprocating power/exhaust vanes configured to reciprocate in and out of the power/exhaust bore as the power/exhaust rotor rotates about the fourth axis.

* * * * *